US009493720B2

(12) United States Patent
Burgess et al.

(10) Patent No.: US 9,493,720 B2
(45) Date of Patent: Nov. 15, 2016

(54) GASOLINE COMPOSITION, METHOD AND USE

(71) Applicants: Vincent Burgess, Ellesmere Port (GB); Jacqueline Reid, Cymau (GB); Simon Mulqueen, Ellesmere Port (GB)

(72) Inventors: Vincent Burgess, Ellesmere Port (GB); Jacqueline Reid, Cymau (GB); Simon Mulqueen, Ellesmere Port (GB)

(73) Assignee: Innospec Limited (GB)

( * ) Notice: Subject to any disclaimer, the term of this patent is extended or adjusted under 35 U.S.C. 154(b) by 0 days.

(21) Appl. No.: 14/518,026

(22) Filed: Oct. 20, 2014

(65) Prior Publication Data

US 2015/0034036 A1 Feb. 5, 2015

Related U.S. Application Data

(63) Continuation of application No. 13/697,502, filed as application No. PCT/GB2011/050894 on May 10, 2011, now abandoned.

(30) Foreign Application Priority Data

May 10, 2010 (GB) .................................. 1007756.8

(51) Int. Cl.
| | | |
|---|---|---|
| F02B 43/00 | (2006.01) | |
| C10L 1/222 | (2006.01) | |
| C10L 1/2383 | (2006.01) | |
| C10L 1/2387 | (2006.01) | |
| C10L 10/04 | (2006.01) | |
| C10L 10/06 | (2006.01) | |
| C10L 10/18 | (2006.01) | |
| C10L 1/224 | (2006.01) | |
| C10L 10/00 | (2006.01) | |
| F02B 43/02 | (2006.01) | |
| C10L 1/198 | (2006.01) | |
| C10L 1/238 | (2006.01) | |
| C10L 1/14 | (2006.01) | |

(52) U.S. Cl.
CPC .............. *C10L 1/2222* (2013.01); *C10L 1/222* (2013.01); *C10L 1/224* (2013.01); *C10L 1/2383* (2013.01); *C10L 1/2387* (2013.01); *C10L 10/00* (2013.01); *C10L 10/04* (2013.01); *C10L 10/06* (2013.01); *C10L 10/18* (2013.01); *F02B 43/02* (2013.01); *C10L 1/143* (2013.01); *C10L 1/198* (2013.01); *C10L 1/1985* (2013.01); *C10L 1/238* (2013.01); *C10L 2200/0259* (2013.01); *C10L 2200/0423* (2013.01); *C10L 2270/023* (2013.01)

(58) Field of Classification Search
USPC .......... 123/1 A; 44/300, 408, 409, 456, 500, 44/628, 422
See application file for complete search history.

(56) References Cited

U.S. PATENT DOCUMENTS

| | | |
|---|---|---|
| 2,812,342 A | 11/1957 | Peters |
| 3,018,250 A | 1/1962 | Anderson et al. |
| 3,110,673 A | 11/1963 | Benoit, Jr. |
| 3,172,892 A | 3/1965 | LeSuer et al. |
| 3,216,936 A | 11/1965 | LeSuer |
| 3,219,666 A | 11/1965 | Norman et al. |
| 3,250,715 A | 5/1966 | Wyman |
| 3,251,853 A | 5/1966 | Hoke |
| 3,260,671 A | 7/1966 | Trites et al. |
| 3,272,746 A | 9/1966 | LeSuer et al. |
| 3,275,554 A | 9/1966 | Hendrik |
| 3,310,492 A | 3/1967 | Benoit, Jr. |
| 3,326,801 A | 6/1967 | Schlobohm et al. |
| 3,337,459 A | 8/1967 | Ford |
| 3,341,542 A | 9/1967 | LeSuer et al. |
| 3,361,673 A | 1/1968 | Stuart et al. |
| 3,405,064 A | 10/1968 | Miller |
| 3,429,674 A | 2/1969 | Hoke |
| 3,438,757 A | 4/1969 | Honnen et al. |
| 3,444,170 A | 5/1969 | Norman et al. |
| 3,454,555 A | 7/1969 | Voort et al. |
| 3,455,831 A | 7/1969 | Davis |
| 3,455,832 A | 7/1969 | Davis |
| 3,468,639 A | 9/1969 | Lindstrom et al. |
| 3,565,804 A | 2/1971 | Honnen et al. |
| 3,576,743 A | 4/1971 | Widmer et al. |

(Continued)

FOREIGN PATENT DOCUMENTS

| | | |
|---|---|---|
| EP | 0565285 A1 | 10/1993 |
| EP | 0633920 B1 | 7/1997 |

(Continued)

OTHER PUBLICATIONS

United Kingdom Intellectual Property Office Search Report dated Sep. 8, 2010 for GB1007756.8.

(Continued)

*Primary Examiner* — Lindsay Low
*Assistant Examiner* — Ruben Picon-Feliciano
(74) *Attorney, Agent, or Firm* — Janine M. Susan; Burns & Levinson, LLP

(57) ABSTRACT

A gasoline composition comprising, as an additive, one or more quaternary ammonium salt(s) (i) formed by the reaction of a compound of formula (A): and a compound formed by the reaction of a hydrocarbyl-substituted acylating agent and an amine of formula (B1) or (B2): wherein R is an optionally substituted alkyl, alkenyl, aryl or alkylaryl group; $R^1$ is an alkyl, aryl or alkylaryl group having up to 36 carbon atoms; $R^2$ and $R^3$ are the same or different alkyl groups having from 1 to 36 carbon atoms; X is an alkylene group having from 1 to 20 carbon atoms; n is from 0 to 20; m is from 1 to 5; and $R^4$ is hydrogen or a $C_1$ to $C_{36}$ alkyl group.

14 Claims, No Drawings

(56) References Cited

U.S. PATENT DOCUMENTS

| | | | |
|---|---|---|---|
| 3,630,904 | A | 12/1971 | Musser et al. |
| 3,632,511 | A | 1/1972 | Liao |
| 3,755,433 | A | 8/1973 | Miller et al. |
| 3,804,763 | A | 4/1974 | Meinhardt |
| 3,822,209 | A | 7/1974 | Knapp et al. |
| 3,857,791 | A | 12/1974 | Marcellis et al. |
| 4,171,959 | A | 10/1979 | Vartanian |
| 4,234,435 | A | 11/1980 | Meinhardt et al. |
| 4,248,719 | A | 2/1981 | Chafetz et al. |
| 4,288,612 | A | 9/1981 | Lewis et al. |
| 5,089,029 | A | 2/1992 | Hashimoto et al. |
| 5,112,364 | A | 5/1992 | Rath et al. |
| 5,254,138 | A | 10/1993 | Kurek |
| 6,217,624 | B1 | 4/2001 | Morris et al. |
| 6,821,307 | B2 | 11/2004 | Caprotti et al. |
| 7,112,230 | B2 | 9/2006 | Malfer et al. |
| 7,491,248 | B2 | 2/2009 | Colucci et al. |
| 2008/0307698 | A1* | 12/2008 | Barton .................. C08F 8/32 44/321 |

FOREIGN PATENT DOCUMENTS

| | | |
|---|---|---|
| EP | 1254889 A1 | 4/2002 |
| EP | 1344785 A1 | 9/2003 |
| GB | 949981 A | 2/1964 |
| WO | 01/42399 A1 | 6/2001 |
| WO | 03/078553 A2 | 9/2003 |
| WO | 2006135881 A2 | 12/2006 |
| WO | 2007015080 A1 | 2/2007 |
| WO | 2008027881 A2 | 3/2008 |
| WO | 2009040582 A1 | 4/2009 |
| WO | 2009140190 A1 | 11/2009 |

OTHER PUBLICATIONS

International Preliminary Report on Patentability dated Nov. 13, 2012 for PCT/GB11/50894.

Extended European Search Report dated Mar. 7, 2013 for EP12195306.1.

International Search Report dated Aug. 19, 2011 for PCT/GB11/50894.

* cited by examiner

GASOLINE COMPOSITION, METHOD AND USE

CROSS-REFERENCE TO RELATED APPLICATIONS

This application is a continuation of co-pending U.S. application Ser. No. 13/697,502, which in turn is a U.S. national stage application under 35 U.S.C. 371 of co-pending International Application No. PCT/GB11/50894 filed May 10, 2011 and entitled "COMPOSITION, METHOD AND USE", which in turn claims priority to Great Britain Patent Application No. 1007756.8 filed May 10, 2010, which is incorporated by reference herein in its entirety for all purposes.

COMPOSITION, METHOD AND USE

This invention relates to a fuel composition and additives thereto. In particular, the invention relates to additives for fuel used in spark ignition engines.

With over a hundred years of development the spark ignition (SI) engine has become a highly tuned piece of engineering. As the SI engine has become more highly tuned it has become more sensitive to variations in its construction. The construction of such engines can change with use as deposits build up on certain components and through wear of other components. These changes in construction may not only change parameters such as power output and overall efficiency; they can also significantly alter the pollutant emissions produced. To try and minimise these time-related changes to an engine's construction fuel additives have been developed to minimise wear and deposit build-up phenomena. Examples include anti valve seat recession additives to reduce wear and detergents to reduce deposit build-up.

As engine technology has evolved so have the demands put upon fuel additive packages. Early gasoline detergents were formulated to overcome the problem of deposit build-up on carburetors. In a carburetor a partial vacuum in part of the engine intake system is used to draw fuel into the induction system. To provide better control of the fuel air mixture carburetors were replaced with fuel injection equipment where a pressure above atmospheric pressure was used to force the fuel into the intake system and to induce better atomisation of the fuel.

As a replacement for carburetors so called throttle body injectors were used with just a single injector taking the place of the carburetor. The position of a throttle body injector was thus very similar to that of the carburetor and the temperature regime was thus similar.

To obtain greater control over the fuel delivery into the engine cylinders there was a move to using individual fuel injectors for each cylinder. These injectors were thus placed in the individual inlet ports for each cylinder; this configuration thus became known as port fuel injection or PFI. Because the fuel injector was now placed closer to the combustion chamber it tended to get hotter, also as it was closer to the engine inlet port it was more likely to be subjected to exhaust gases passing back into the inlet system during the initial part of the inlet valve opening event. This made the injector more prone to deposit build up and thus increased the demands on the fuel additive required to minimise this deposit build-up.

In the proprietor's patent EP0633920, a detergent composition is taught which addressed the issues of
 i) elimination of carburetor and injector fouling;
 ii) good detergency in the intake port and intake valve regions of the engine;
 iii) elimination of valve stick, a problem often associated with the use of high molecular weight detergents;
 iv) corrosion protection;
 v) good demulsifying characteristics; and
 vi) little or no effect on the Octane Requirement Increase (ORI) of modern engines.

All these systems so far outlined were designed to provide an air fuel mixture that was approximately stoichiometric. The engine power was determined by the amount of stoichiometric mixture provided to the cylinder. This was controlled by restricting the flow of mixture into the cylinders, known as throttling. This inevitably incurred pumping losses thus reducing the efficiency of the overall system.

To overcome this problem engine designers have developed injection systems where the fuel is injected directly into the cylinder. Such engines are alternatively known as direct injection spark ignition (DISI), direct injection gasoline (DIG), gasoline direct injection (GDI), etc. Injecting directly into the combustion chamber allows for some degree of stratification of the charge thus allowing an overall lean mixture whilst having a local rich or stoichiometric mixture to facilitate reliable combustion. This injection strategy however means that the fuel injector is subjected to higher temperatures and pressures. This increases the likelihood of forming deposits from the high temperature degradation of the fuel, the fact that the injector is in the combustion chamber also exposes the injector to combustion gases which may contain partially oxidised fuel and or soot particles which may accumulate, increasing the level of deposits. The ability to provide good atomisation of fuel and precise control of fuel flow rates and injection duration are critical to the optimum performance of these engine designs. The radically different operating environment of the fuel injector poses a whole new set of design constraints on the development of an effective fuel additive package. Mixture stratification can also result in combustion occurring in local rich regions leading to the formation of soot particles which can increase combustion chamber deposits. Because liquid fuel is injected into the combustion chamber there is a greater risk of liquid impingement on the combustion chamber surfaces, particularly the piston crown. Liquid fuel on the combustion chamber surfaces can undergo thermal decomposition leading to gum formation and thus increase the rate of build-up of combustion chamber deposits.

An additional problem arising from injecting the fuel directly into the combustion chamber is that fuel impingement on the inlet valves is significantly reduced. The use of fuel containing detergents was relied upon to remove the deposits that build up on the inlet valve tulip as a result of lubricating oil passing down the valve stem and from combustion gases passing back into the inlet system during the initial part of the inlet valve opening event. In a direct injection engine the only possibility for fuel to impinge on the inlet valve tulip is from early injection and late inlet valve closing. This therefore makes it extremely difficult for a fuel borne detergent to have a significant effect on inlet valve deposits.

Effective control of deposits in a direct injection spark ignition gasoline engine is, therefore, a challenging task. Knowledge gained in using additives in other contexts, for example in gasoline engines using carburetors or in gasoline engines using an individual, common, fuel injector, or fuel injectors in the inlet port of each cylinder, or in diesel engines, appear to be of little assistance in achieving effective control of deposits in a direct injection spark ignition gasoline engine.

The particular difficulties in achieving effective control of deposits in a direct injection spark ignition gasoline engine are known in the art. For example they are also explained in WO 01/42399, U.S. Pat. Nos. 7,112,230, 7,491,248 and WO 03/78553.

Even though fuel compositions and additives have been proposed for controlling deposits in each of the regimes described above, such difficulties show that there is a continuing need for fuel compositions which are effective in either or both of direct injection spark ignition gasoline engines and/or spark ignition gasoline engines without direct injection.

According to a first aspect of the present invention there is provided a gasoline composition comprising, as an additive, one or more quaternary ammonium salt(s) (i) formed by the reaction of a compound of formula (A):

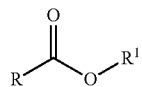

(A)

and a compound formed by the reaction of a hydrocarbyl-substituted acylating agent and an amine of formula (B1) or (B2):

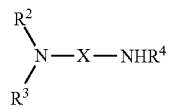

(B1)

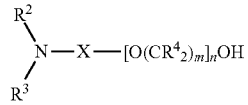

(B2)

wherein R is an optionally substituted alkyl, alkenyl, aryl or alkylaryl group; $R^1$ is a $C_1$ to $C_{36}$ alkyl, aryl or alkylaryl group; $R^2$ and $R^3$ are the same or different alkyl groups having from 1 to 36 carbon atoms; X is an alkylene group having from 1 to 20 carbon atoms; n is from 0 to 20; m is from 1 to 5; and $R^4$ is hydrogen or a $C_1$ to $C_{36}$ alkyl group.

These additive compounds may be referred to herein as quaternary ammonium salt(s) (i) or "the quaternary ammonium salt(s) additives".

The compound of formula (A) is an ester of a carboxylic add capable of reacting with a tertiary amine to form a quaternary ammonium salt.

Suitable compounds of formula (A) include esters of carboxylic acids having a $pK_a$ of 3.5 or less.

The compound of formula (A) is preferably an ester of a carboxylic acid selected from a substituted aromatic carboxylic acid, an α-hydroxycarboxylic acid and a polycarboxylic acid.

In some preferred embodiments the compound of formula (A) is an ester of a substituted aromatic carboxylic acid and thus R is a substituted aryl group.

Preferably R is a substituted aryl group having 6 to 10 carbon atoms, preferably a substituted phenyl or naphthyl group, most preferably a substituted phenyl group. R is suitably substituted with one or more groups selected from optionally substituted alkyl, alkenyl, aryl or carboalkoxy groups, nitro, cyano, hydroxy, $SR^5$, $NR^5R^6$ or $COOR^7$. Each of $R^5$, $R^6$ and $R^7$ may be hydrogen or optionally substituted alkyl, alkenyl, aryl or carboalkoxy groups. Preferably each of $R^5$, $R^6$ and $R^7$ is hydrogen or an optionally substituted $C_1$ to $C_{36}$ alkyl group, preferably hydrogen or a $C_1$ to $C_{16}$ alkyl group, preferably hydrogen or a $C_1$ to $C_{10}$ alkyl group, more preferably hydrogen or a $C_1$ to $C_4$ alkyl group. Preferably $R^5$ is hydrogen and each of $R^6$ and $R^7$ is hydrogen or a $C_1$ to $C_4$ alkyl group. Most preferably $R^5$ and $R^6$ are both hydrogen. Preferably R is an aryl group substituted with one or more groups selected from hydroxyl, carboalkoxy, nitro, cyano and $NH_2$. Preferably R is a mono-substituted aryl group. Preferably R is an ortho substituted aryl group. Suitably R is substituted with a group selected from OH, $NH_2$, $NO_2$ or COOMe. Preferably R is substituted with an OH or $NH_2$ group. Suitably R is a hydroxy substituted aryl group. Most preferably R is a 2-hydroxyphenyl group.

Preferably $R^1$ is an alkyl or alkylaryl group. $R^1$ may be a $C_1$ to $C_{16}$ alkyl group, preferably a $C_1$ to $C_{10}$ alkyl group, suitably a $C_1$ to $C_8$ alkyl group. $R^1$ may be $C_7$ to $C_{22}$ alkylaryl group, preferably a $C_7$ to $C_{16}$ alkylaryl group, suitably a $C_7$ to $C_{14}$ alkylaryl group. $R^1$ may be methyl, ethyl, propyl, butyl, pentyl, benzyl or an isomer therefor. Preferably $R^1$ is benzyl or methyl. Most preferably $R^1$ is methyl.

An especially preferred compound of formula (A) is methyl salicylate.

In some embodiments the compound of formula (A) is an ester of an α-hydroxycarboxylic acid.

In such embodiments the compound of formula (A) has the structure:

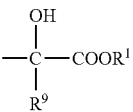

wherein $R^7$ and $R^8$ are the same or different and each is selected from hydrogen, alkyl, alkenyl, aralkyl or aryl. Compounds of this type suitable for use herein are described in EP 1254889.

Examples of compounds of formula (A) in which RCOO is the residue of an α-hydroxycarboxylic acid include methyl-, ethyl-, propyl-, butyl-, pentyl-, hexyl-, benzyl-, phenyl-, and allyl esters of 2-hydroxyisobutyric acid; methyl-, ethyl-, propyl-, butyl-, pentyl-, hexyl-, benzyl-, phenyl-, and allyl esters of 2-hydroxy-2-methylbutyric acid; methyl-, ethyl-, propyl-, butyl-, pentyl-, hexyl-, benzyl-, phenyl-, and allyl esters of 2-hydroxy-2-ethylbutyric acid; methyl-, ethyl-, propyl-, butyl-, pentyl-, hexyl-, benzyl-, phenyl-, and allyl esters of lactic acid; and methyl-, ethyl-, propyl-, butyl-, pentyl-, hexyl-, allyl-, benzyl-, and phenyl esters of glycolic acid. Of the above, a preferred compound is methyl 2-hydroxyisobutyrate.

In some embodiments the compound of formula (A) is an ester of a polycarboxylic acid. In this definition we mean to include dicarboxylic acids and carboxylic acids having more than 2 acidic moieties. In such embodiments RCOO is preferably present in the form of an ester, that is the one or more further acid groups present in the group R are in esterified form. Preferred esters are $C_1$ to $C_4$ alkyl esters.

Compound (A) may be selected from the diester of oxalic acid, the diester of phthalic acid, the diester of maleic acid, the diester of malonic acid or the diester of citric acid. One especially preferred compound of formula (A) is dimethyl oxalate.

In preferred embodiments the compound of formula (A) is an ester of a carboxylic acid having a $pK_a$ of less than 3.5. In such embodiments in which the compound includes more than one acid group, we mean to refer to the first dissociation constant. Compound (A) may be selected from an ester of a carboxylic acid selected from one or more of oxalic acid, phthalic acid, salicylic acid, maleic acid, malonic acid, citric acid, nitrobenzoic acid, aminobenzoic acid and 2,4,6-trihydroxybenzoic acid.

Preferred compounds of formula (A) include dimethyl oxalate, methyl 2-nitrobenzoate and methyl salicylate.

To form the quaternary ammonium salt additives of the present invention the compound of formula (A) is reacted with a compound formed by the reaction of a hydrocarbyl substituted acylating agent and an amine of formula (B1) or (B2).

When a compound of formula (B1) is used, $R^4$ is preferably hydrogen or a $C_1$ to $C_{16}$ alkyl group, preferably a $C_1$ to $C_{10}$ alkyl group, more preferably a $C_1$ to $C_6$ alkyl group. More preferably $R^4$ is selected from hydrogen, methyl, ethyl, propyl, butyl and isomers thereof. Most preferably $R^4$ is hydrogen.

When a compound of formula (B2) is used, each $R^4$ is preferably hydrogen or a $C_1$ to $C_6$ alkyl group. More preferably each $R^4$ is selected from hydrogen, methyl, ethyl, propyl, butyl and isomers thereof. Most preferably each $R^4$ is hydrogen or methyl.

When a compound of formula (B2) is used, m is preferably 2 or 3, most preferably 2; n is preferably from 0 to 15, preferably 0 to 10, more preferably from 0 to 5. Most preferably n is 0 and the compound of formula (B2) is an alcohol.

Preferably the hydrocarbyl substituted acylating agent is reacted with a diamine compound of formula (B1).

$R^2$ and $R^3$ may each independently be a $C_1$ to $C_{10}$ alkyl group, preferably a $C_1$ to $C_{10}$ alkyl group. $R^2$ and $R^3$ may independently be methyl, ethyl, propyl, butyl, pentyl, hexyl, heptyl, octyl, or an isomer of any of these. Preferably $R^2$ and $R^3$ is each independently $C_1$ to $C_4$ alkyl. Preferably $R^2$ is methyl. Preferably $R^3$ is methyl.

X is preferably an alkylene group having 1 to 16 carbon atoms, preferably 1 to 12 carbon atoms, more preferably 1 to 8 carbon atoms, for example 2 to 6 carbon atoms or 2 to 5 carbon atoms. Most preferably X is an ethylene, propylene or butylene group, especially a propylene group.

An especially preferred compound of formula (B1) is dimethylaminopropane.

The amine of formula (B1) or (B2) is reacted with a hydrocarbyl substituted acylating agent. The hydrocarbyl substituted acylating agent may be based on a hydrocarbyl substituted mono-di- or polycarboxylic acid or a reactive equivalent thereof. Preferably the hydrocarbyl substituted acylating agent is a hydrocarbyl substituted succinic acid compound such as a succinic acid or succinic anhydride.

The hydrocarbyl substituent preferably comprises at least 10, more preferably at least 12, for example 30 or 50 carbon atoms. It may comprise up to about 200 carbon atoms. Preferably the hydrocarbyl substituent has a number average molecular weight (Mn) of between 170 to 2800, for example from 250 to 1500, preferably from 500 to 1500 and more preferably 500 to 1100. An Mn of 700 to 1300 is especially preferred.

The hydrocarbyl substituent may comprise an alpha olefin having at least 10 carbon atoms for example at least 12 carbon atoms or at least 14 carbon atoms or at least 16 carbon atoms. The hydrocarbyl substituent may comprise an alpha olefin having up to 200 carbon atoms for example up to 50 carbon atoms or up to 30 carbon atoms or up to 24 carbon atoms or up to 20 carbon atoms.

The hydrocarbyl based substituents may be made from homo- or interpolymers (e.g. copolymers, terpolymers) of mono- and di-olefins having 2 to 10 carbon atoms, for example ethylene, propylene, butane-1, isobutene, butadiene, isoprene, 1-hexene, 1-octene, etc. Preferably these olefins are 1-monoolefins. The hydrocarbyl substituent may also be derived from the halogenated (e.g. chlorinated or brominated) analogs of such homo- or interpolymers. Alternatively the substituent may be made from other sources, for example monomeric high molecular weight alkenes (e.g. 1-tetra-contene) and chlorinated analogs and hydrochlorinated analogs thereof, aliphatic petroleum fractions, for example paraffin waxes and cracked and chlorinated analogs and hydrochlorinated analogs thereof, white oils, synthetic alkenes for example produced by the Ziegler-Natta process (e.g. poly(ethylene) greases) and other sources known to those skilled in the art. Any unsaturation in the substituent may if desired be reduced or eliminated by hydrogenation according to procedures known in the art.

The term "hydrocarbyl" as used herein denotes a group having a carbon atom directly attached to the remainder of the molecule and having a predominantly aliphatic hydrocarbon character. Suitable hydrocarbyl based groups may contain non-hydrocarbon moieties. For example they may contain up to one non-hydrocarbyl group for every ten carbon atoms provided this non-hydrocarbyl group does not significantly alter the predominantly hydrocarbon character of the group. Those skilled in the art will be aware of such groups, which include for example hydroxyl, oxygen, halo (especially chloro and fluoro), alkoxyl, alkyl mercapto, alkyl sulphoxy, etc. Preferred hydrocarbyl based substituents are purely aliphatic hydrocarbon in character and do not contain such groups.

The hydrocarbyl-based substituents are preferably predominantly saturated, that is, they contain no more than one carbon-to-carbon unsaturated bond for every ten carbon-to-carbon single bonds present. Most preferably they contain no more than one carbon-to-carbon unsaturated bond for every 50 carbon-to-carbon bonds present.

Preferred hydrocarbyl-based substituents are poly(isobutene)s known in the art. Thus in especially preferred embodiments the hydrocarbyl substituted acylating agent is a polyisobutenyl substituted succinic anhydride.

The preparation of polyisobutenyl substituted succinic anhydrides (PIBSA) is documented in the art. Suitable processes include thermally reacting polyisobutenes with maleic anhydride (see for example U.S. Pat. Nos. 3,361,673 and 3,018,250), and reacting a halogenated, in particular a chlorinated, polyisobutene (PIB) with maleic anhydride (see for example U.S. Pat. No. 3,172,892). Alternatively, the polyisobutenyl succinic anhydride can be prepared by mixing the polyolefin with maleic anhydride and passing chlorine through the mixture (see for example GB-A-949,981).

Conventional polyisobutenes and so-called "highly-reactive" polyisobutenes are suitable for use in the invention. Highly reactive polyisobutenes in this context are defined as polyisobutenes wherein at least 50%, preferably 70% or more, of the terminal olefinic double bonds are of the vinylidene type as described in EP0565285. Particularly preferred polyisobutenes are those having more than 80 mol % and up to 100% of terminal vinylidene groups such as those described in EP1344785.

Other preferred hydrocarbyl groups include those having an internal olefin for example as described in the applicant's published application WO2007/015080.

An internal olefin as used herein means any olefin containing predominantly a non-alpha double bond, that is a beta or higher olefin. Preferably such materials are substantially completely beta or higher olefins, for example containing less than 10% by weight alpha olefin, more preferably less than 5% by weight or less than 2% by weight. Typical internal olefins include Neodene 1518 IO available from Shell.

Internal olefins are sometimes known as isomerised olefins and can be prepared from alpha olefins by a process of isomerisation known in the art, or are available from other sources. The fact that they are also known as internal olefins reflects that they do not necessarily have to be prepared by isomerisation.

By the term "gasoline", it is meant a liquid fuel for use with spark ignition engines (typically or preferably containing primarily or only C4-C12 hydrocarbons) and satisfying international gasoline specifications, such as ASTM D-439 and EN228. The term includes blends of distillate hydrocarbon fuels with oxygenated components such as alcohols or ethers for example methanol, ethanol, butanol, methyl t-butyl ether (MTBE), ethyl t-butyl ether (ETBE), as well as the distillate fuels themselves.

Controlling deposits in the specification is intended to cover one or more of: reducing existing deposits ("clean-up"); reducing deposit formation ("keep-clean"); modifying deposits so as to reduce their negative effects.

It has surprisingly been found that the gasoline compositions used in this invention achieve good control of deposits in spark ignition gasoline engines.

It has surprisingly been found that the gasoline compositions used in this invention achieve good control of deposits even in the demanding context of the direct injection spark ignition gasoline engine.

This control of deposits may lead to a significant reduction in maintenance costs and/or an increase in power and/or an improvement in fuel economy.

In some preferred embodiments, the quaternary ammonium salt additives may be used without additional components. In other preferred embodiments, the quaternary ammonium salt additive (i) is used with one or more additional components (ii) selected from:
 a) carrier oils
 b) acylated nitrogen compounds which are the reaction product of a carboxylic acid-derived acylating agent and an amine
 c) hydrocarbyl-substituted amines wherein the hydrocarbyl substituent is substantially aliphatic and contains at least 8 carbon atoms
 d) mannich base additives comprising nitrogen-containing condensates of a phenol, aldehyde and primary or secondary amine
 e) aromatic esters of a polyalkylphenoxyalkanol.

Preferably the ratio of the quaternary ammonium salt additive (i) to additional components (ii) when present, is 1:100 to 100:1, preferably 1:50:50:1, preferably 1:15 to 20:1 preferably 1:15 to 10:1 preferably 1:10 to 10:1 preferably 1:5 to 5:1.

Preferably the ratio of the quaternary ammonium salt additive (i) to carrier oil a) when present, is 1:100 to 100:1, preferably 1:50:50:1, preferably 1:15 to 20:1 preferably 1:15 to 10:1 preferably 1:10 to 10:1 preferably 1:5 to 5:1, preferably 1:2 to 2:1.

Preferably the ratio of the quaternary ammonium salt additive (i) to mannich base additives d) when present, is 1:100 to 100:1, preferably 1:50:50:1, preferably 1:15 to 20:1 preferably 1:15 to 10:1 preferably 1:10 to 10:1 preferably 1:5 to 5:1, preferably 1:2 to 2:1.

Preferably the ratio of the total of the quaternary ammonium salt additive (I) and components b), c), d) and e) to carrier oil a) when present, is 1:100 to 100:1, preferably 1:50:50:1, preferably 1:15 to 20:1 preferably 1:15 to 10:1 preferably 1:10 to 10:1 preferably 1:5 to 5:1, preferably 1:2 to 2:1.

All ratios are weight ratios on an active basis. The total amount of compound(s) (i) and each compound a)-e) specified in the respective definition is to be taken into account.

a) Carrier Oil

The carrier oil may have any suitable molecular weight. A preferred molecular weight is in the range 500 to 5000.

In one embodiment the carrier oil may comprise an oil of lubricating viscosity. The oil of lubricating viscosity includes natural or synthetic oils of lubricating viscosity, oil derived from hydrocracking, hydrogenation, hydrofinishing, unrefined, refined and re-refined oils, or mixtures thereof. In one embodiment, the oil of lubricating viscosity is a carrier fluid for the dispersant and/or other performance additives.

Natural oils include animal oils, vegetable oils, mineral oils or mixtures thereof. Synthetic oils include a hydrocarbon oil, a silicon-based oil, a liquid ester of phosphorus-containing acid. Synthetic oils may be produced by Fischer-Tropsch reactions and typically may be hydroisomerised Fischer-Tropsch hydrocarbons or waxes.

Oils of lubricating viscosity may also be defined as specified in the American Petroleum Institute (API) Base Oil Interchangeability Guidelines. In one embodiment the oil of lubricating viscosity comprises an API Group I, II, III, IV, V or mixtures thereof, and in another embodiment API Group I, II, ill or mixtures thereof.

In another embodiment the carrier oil may comprise a polyether carrier oil.

In a preferred aspect the polyether carrier oil is a mono end-capped polyalkylene glycol.

Preferably the end cap is a group consisting of or containing a hydrocarbyl group having up to 30 carbon atoms. More preferably the end cap is or comprises an alkyl group having from 4 to 20 carbon atoms or from 12 to 18 carbon atoms.

The alkyl group may be branched or straight chain. Preferably it is a straight chain group.

Further hydrocarbyl end capping groups include alkyl-substituted phenyl, especially where the alkyl substituent(s) is or are alkyl groups of 4 to 20 carbon atoms, preferably 8 to 12, preferably straight chain.

The hydrocarbyl end capping group may be attached to the polyether via a linker group. Suitable end cap linker groups include an ether oxygen atom (—O—), an amine group (—NH—), an amide group (—CONH—), or a carbonyl group —(C=O)—.

Such end capped polyalkyleneglycols are obtainable by the polymerisation of $C_2$-$C_6$ alkylene oxides either as homopolymers or copolymers containing 4-100 repeat units. Copolymers may be random copolymers or block copolymers.

In a preferred aspect the polyether carrier oil is a mono end-capped polypropylene glycol.

In a preferred embodiment the carrier oil is a polyalkyleneglycol monoether of the formula:

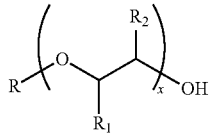
(C1)

where R is a hydrocarbyl group having from 1 to 30 carbon atoms; R1 and R2 are each independently hydrogen or lower alkyl having from about 1 to about 6 carbon atoms and each $R_1$ and $R_2$ is independently selected in each —O—$CHR_1$—$CHR_2$— unit; and x is an integer of from 5 to 100, preferably 10 to 50, preferably 10 to 30, preferably 10-25, more preferably 12 to 25, more preferably 12 to 20.

In a preferred embodiment R is a straight chain $C_1$-$C_{30}$ alkyl, preferably $C_4$-$C_{20}$ alkyl, preferably $C_8$-$C_{18}$ alkyl, and more preferably $C_{12}$-$C_{18}$ alkyl or $C_8$-$C_{14}$ alkyl.

In another preferred embodiment R is an alkylphenyl group preferably an alkylphenyl group, wherein the alkyl moiety is a straight or branched chain alkyl of from about 1 to about 24 carbon atoms.

Preferably, one of $R_1$ and $R_2$ is lower alkyl of 1 to 4 carbon atoms, and the other is hydrogen. More preferably, one of $R_1$ and $R_2$ is methyl or ethyl, and the other is hydrogen.

In a preferred embodiment the carrier oil is a polypropyleneglycol monoether of the formula:

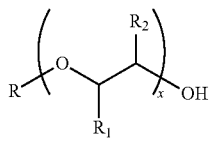
(C2)

where R, $R_1$, $R_2$ and x are as defined above, and in each repeat unit one of $R_1$ and $R_2$ are hydrogen and the other is methyl.

Such alkyl polypropyleneglycol monoethers are obtainable by the polymerisation of propylene oxide using an aliphatic alcohol, preferably a straight chain primary alcohol of up to 20 carbon atoms, as an initiator. If desired a proportion of the propyleneoxy units, for example up to 50% of the propyleneoxy units by weight, may be replaced by units derived from other $C_2$-$C_6$ alkylene oxides, e.g. ethylene oxide or isobutylene oxide, and are to be included within the term "polypropyleneglycol". Alternatively, the initiator may be a phenol, alkyl phenol, a hydrocarbyl amine or amide, containing 1-30 carbon atoms, preferably a saturated aliphatic or aromatic hydrocarbyl group such as alkyl, phenyl or phenalkyl etc. Preferred initiators include long chain alkanols giving rise to the long chain polypropyleneglycol monoalkyl ethers.

In a further aspect the polyalkyleneglycol may be an ester. In this aspect the carrier oil may be a polypropyleneglycol monoester of the formula

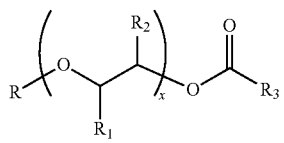
(C3)

where R, $R_1$, $R_2$ and x are as defined for (C1) above and $R_3$ is a $C_1$-$C_{30}$ hydrocarbyl group, preferably an aliphatic hydrocarbyl group, and more preferably $C_1$-$C_{10}$ alkyl.

In another embodiment a polyetheramine may be present.

It is known to those skilled in the art that the class of compounds known as polyetheramines function as deposit control additives. It is common for polyetheramines to be used as detergents and/or as carrier oils. For the purpose of this specification polyetheramines are classed herein as carrier oils.

Suitable hydrocarbyl-substituted polyoxyalkylene amines or polyetheramines employed in the present invention are described in the literature (for example U.S. Pat. Nos. 6,217,624 and 4,288,612) and have the general formula:

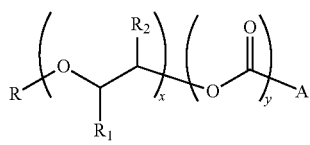
(C4)

or a fuel-soluble salt thereof; R, $R_1$, $R_2$ and x are as defined for (C1) above; A is amino, N-alkyl amino having about 1 to about 20 carbon atoms in the alkyl group, N,N-dialkyl amino having about 1 to about 20 carbon atoms in each alkyl group, or a polyamine moiety having about 2 to about 12 amine nitrogen atoms and about 2 to about 40 carbon atoms; and y is 0 or 1.

In general, A is amino, N-alkyl amino having from about 1 to about 20 carbon atoms in the alkyl group, preferably about 1 to about 6 carbon atoms, more preferably about 1 to about 4 carbon atoms; N,N-dialkyl amino having from about 1 to about 20 carbon atoms in each alkyl group, preferably about 1 to about 6 carbon atoms, more preferably about 1 to about 4 carbon atoms; or a polyamine moiety having from about 2 to about 12 amine nitrogen atoms and from about 2 to about 40 carbon atoms, preferably about 2 to 12 amine nitrogen atoms and about 2 to 24 carbon atoms. More preferably, A is amino or a polyamine moiety derived from a (poly)alkylene polyamine, including alkylene diamine. Most preferably, A is amino or a polyamine moiety derived from ethylene diamine or diethylene triamine.

The polyetheramines will generally have a molecular weight in the range from about 600 to about 10,000.

Fuel-soluble salts of the compounds of formula I can be readily prepared for those compounds containing an amino or substituted amino group and such salts are contemplated to be useful for preventing or controlling engine deposits. Suitable salts include, for example, those obtained by protonating the amino moiety with a strong organic acid, such as an alkyl- or arylsulfonic acid. Preferred salts are derived from toluenesulfonic acid and methanesulfonic acid.

Other suitable polyetheramines are those taught in U.S. Pat. Nos. 5,089,029 and 5,112,364.

b) Acylated Nitrogen Compounds which are the Reaction Product of a Carboxylic Acid-Derived Acylating Agent and an Amine The carboxylic derived acylating agent may be a hydrocarbyl substituted acylating agent as described for the quaternary ammonium salt(s) (i).

Amines useful for reaction with these acylating agents include the following:

(1) (poly)alkylene polyamines of the general formula:

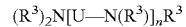

wherein each $R^3$ is independently selected from a hydrogen atom, a hydrocarbyl group or a hydroxy-substituted hydrocarbyl group containing up to about 30 carbon atoms, with proviso that at least one $R^3$ is a hydrogen atom, n is a whole number from 1 to 10 and U is a C1-18 alkylene group. Preferably each $R^3$ is independently selected from hydrogen, methyl, ethyl, propyl, isopropyl, butyl and isomers thereof. Most preferably each $R^{31}$ is ethyl or hydrogen. U is preferably a C1-4 alkylene group, most preferably ethylene.

Specific examples of (poly)alkylene polyamines (1) include ethylenediamine, diethylenetriamine, triethylenetetramine, tetraethylenepentamine, tri(tri-methylene)tetramine, pentaethylenehexamine, hexaethylene-heptamine, 1,2-propylenediamine, and other commercially available materials which comprise complex mixtures of polyamines. For example, higher ethylene polyamines optionally containing all or some of the above in addition to higher boiling fractions containing 8 or more nitrogen atoms etc.

Specific examples of (poly)alkylene polyamines (1) which are hydroxyalkyl-substituted polyamines include N-(2-hydroxyethyl)ethylene diamine, N,N'-bis(2-hydroxyethyl)ethylene diamine, N-(3-hydroxybutyl)tetramethylene diamine, etc.

(2) heterocyclic-substituted polyamines including hydroxyalkyl-substituted polyamines wherein the polyamines are as described above and the heterocyclic substituent is selected from nitrogen-containing aliphatic and aromatic heterocycles, for example piperazines, imidazolines, pyrimidines, morpholines, etc.

Specific examples of the heterocyclic-substituted polyamines (2) are N-2-aminoethyl piperazine, N-2 and N-3 amino propyl morpholine, N-3(dimethyl amino) propyl piperazine, 2-heptyl-3-(2-aminopropyl)imidazoline, 1,4-bis (2-aminoethyl) piperazine, 1-(2-hydroxy ethyl) piperazine, and 2-heptadecyl-1-(2-hydroxyethyl)-imidazoline, etc.

(3) aromatic polyamines of the general formula:

wherein Ar is an aromatic nucleus of 6 to 20 carbon atoms, each $R^3$ is as defined above and y is from 2 to 8.

Specific examples of the aromatic polyamines (3) are the various isomeric phenylene diamines, the various isomeric naphthalene diamines, etc.

4) The amine reactant may alternatively be a compound of general formula $R^2R^3NH$ where each of $R^2$ and $R^3$ independently represents a hydrocarbyl group (as defined herein), preferably a hydrocarbon group (as defined herein), or a hydrogen atom.

Preferably at least one of $R^2$ and $R^3$ represents a hydrocarbyl group.

Preferably both $R^2$ and $R^3$ represent a hydrocarbyl group.

Suitable terminal groups of a hydrocarbyl group $R^2$ and/or $R^3$ may include —$CH_3$, =$CH_2$, —OH, —C(O)OH and derivatives thereof. Suitable derivatives include esters and ethers. Preferably a hydrocarbyl group $R^2$ and/or $R^3$ does not contain a terminal amine.

A preferred hydrocarbyl group for each of $R^2$ and $R^3$ is a group of the formula

wherein $R^4$ is an alkylene group having from 1 to 10 carbons, preferably from 1 to 5, preferably 1 to 3 carbons, preferably 2 carbons;

wherein $R^5$ is an alkylene group having from 1 to 10 carbons, preferably from 1 to 5, preferably 1 to 3 carbons, preferably 2 carbons;

wherein p is an integer from 0 to 10;

wherein X is selected from —$CH_3$, —$CH_2$=$CH_2$, —OH, and —C(O)OH.

A preferred hydrocarbyl group for each of $R^2$ and $R^3$ is a group of the formula

wherein p is an integer from 0 to 10, preferably 1 to 10, preferably from 1 to 5, preferably from 1 to 3, preferably 1 or 2;

wherein q is an integer from 1 to 10, preferably 1 to 10, preferably from 1 to 5, preferably from 1 to 3, preferably 1 or 2;

wherein r is an integer from 1 to 10, preferably 1 to 10, preferably from 1 to 5, preferably from 1 to 3, preferably 1 or 2; and wherein X is selected from —$CH_3$, —$CH_2$=$CH_2$, —OH, and —C(O)OH.

Preferably X is —$CH_3$, or —OH.

Further amines which may be used in this invention include compounds derived from amines selected from ammonia, butylamine, aminoethylethanolamine, aminopropan-2-ol, 5-aminopentan-1-ol, 2-(2-aminoethoxy)ethanol, monoethenolamine, 3-aminopropan-1-ol, 2-((3-aminopropyl)amino)ethanol, dimethylaminopropylamine, and N-(alkoxyalkyl)-alkanediamines including N-(octyloxyethyl)-1,2-diaminoethane and N-(decyloxypropyl)-N-methyl-1,3-diaminopropane.

Specific examples of amines which may be used in this invention and having a tertiary amino group can include but are not limited to: N,N-dimethyl-aminopropylamine, N,N-diethyl-aminopropylamine, N,N-dimethyl-amino ethylamine. The nitrogen or oxygen containing compounds capable of condensing with the acylating agent and further having a tertiary amino group can further include amino alkyl substituted heterocyclic compounds such as 1-(3-aminopropyl) imidazole and 4-(3-aminopropyl)morpholine, 1-(2-aminoethyl)piperidine, 3,3-diamino-N-methyldi-propylamine, and 3'3-aminobis(N,N-dimethylpropylamine). Other types of compounds capable of condensing with the acylating agent and having a tertiary amino group include alkanolamines including but not limited to triethanolamine, trimethanolamine, N,N-dimethylaminopropanol, N,N-diethylaminopropanol, N,N-diethylaminobutanol, N,N,N-tris(hydroxyethyl)amine and N,N,N-tris(hydroxymethyl)amine.

Many patents have described useful acylated nitrogen compounds including U.S. Pat. Nos. 3,172,892; 3,219,666; 3,272,746; 3,310,492; 3,341,542; 3,444,170; 3,455,831; 3,455,832; 3,576,743; 3,630,904; 3,632,511; 3,804,763, 4,234,435 and 6,821,307.

A preferred acylated nitrogen compound of this class is that made by reacting a poly(isobutene)-substituted succinic acid-derived acylating agent (e.g., anhydride, acid, ester, etc.) wherein the poly(isobutene) substituent has between about 12 to about 200 carbon atoms and the acylating agent has from 1 to 5, preferably from 1 to 3, preferably 1 or 2, succinic-derived acylating groups; with a mixture of ethylene polyamines having 3 to about 9 amino nitrogen atoms, preferably about 3 to about 8 nitrogen atoms, per ethylene polyamine and about 1 to about 8 ethylene groups. These acylated nitrogen compounds are formed by the reaction of a molar ratio of acylating agent:amino compound of from 10:1 to 1:10, preferably from 5:1 to 1:5, more preferably from 2.5:1 to 1:2, more preferably from 2:1 to 1:2 and most preferably from 2:1 to 1:1. In especially preferred embodiments, the acylated nitrogen compounds are formed by the reaction of acylating agent to amino compound in a molar ratio of from 1.8:1 to 1:1.2, preferably from 1.6:1 to 1:1.2, more preferably from 1.4:1 to 1:1.1 and most preferably from 1.2:1 to 1:1. This type of acylated amino compound and the preparation thereof is well known to those skilled in the art and are described in the above-referenced US patents. In other especially preferred embodiments, the acylated nitrogen compounds are formed by the reaction of acylating agent to amino compound in a molar ratio of from 2.5:1 to 1.5:1, preferably from 2.2:1 to 1.8:1.

Another type of acylated nitrogen compound belonging to this class is that made by reacting the afore-described alkylene amines with the afore-described substituted succinic acids or anhydrides and aliphatic mono-carboxylic acids having from 2 to about 22 carbon atoms. In these types of acylated nitrogen compounds, the mole ratio of succinic acid to mono-carboxylic acid ranges from about 1:0.1 to about 1:1. Typical of the monocarboxylic acid are formic acid, acetic acid, dodecanoic acid, butanoic acid, oleic acid, stearic acid, the commercial mixture of stearic acid isomers known as isostearic acid, tolyl acid, etc. Such materials are more fully described in U.S. Pat. Nos. 3,216,936 and 3,250,715.

A further type of acylated nitrogen compound belonging to this class is the product of the reaction of a fatty monocarboxylic acid of about 12-30 carbon atoms and the afore-described alkylene amines, typically, ethylene, propylene or trimethylene polyamines containing 2 to 8 amino groups and mixtures thereof. The fatty mono-carboxylic acids are generally mixtures of straight and branched chain fatty carboxylic acids containing 12-30 carbon atoms. Fatty dicarboxylic acids could also be used. A widely used type of acylated nitrogen compound is made by reacting the afore-described alkylene polyamines with a mixture of fatty acids having from 5 to about 30 mole percent straight chain acid and about 70 to about 95 percent mole branched chain fatty acids. Among the commercially available mixtures are those known widely in the trade as isostearic acid. These mixtures are produced as a by-product from the dimerization of unsaturated fatty acids as described in U.S. Pat. Nos. 2,812,342 and 3,260,671.

The branched chain fatty acids can also include those in which the branch may not be alkyl in nature, for example phenyl and cyclohexyl stearic acid and the chloro-stearic acids. Branched chain fatty carboxylic acid/alkylene polyamine products have been described extensively in the art. See for example, U.S. Pat. Nos. 3,110,673; 3,251,853; 3,326,801; 3,337,459; 3,405,064; 3,429,674; 3,468,639; 3,857,791. These patents are referenced for their disclosure of fatty acid/polyamine condensates for their use in lubricating oil formulations.

Suitably the molar ratio of the acylating group of an acylating agent defined above and the reacting amine group of said amine is in the range 0.5-5:1, preferably 0.8-2.2:1. At a ratio of 1:1 the reaction product is called mono-PIBSI, and at a ratio of 2:1 it is called bis-PIBSI and requires a polyamine as reactant.

Preferred acylated nitrogen compounds for use herein include: the compound formed by reacting a polyisobutylene succinic anhydride (PIBSA) having a PIB molecular weight of 900 to 1100, for example approximately 1000 with aminoethyl ethanolamine or triethylene tetramine; and the compound formed by reacting a PIBSA having a PIB molecular weight of 650 to 850, for example about 750 with tetraethylene pentamine. In each case the ratio of PIBSA to amine is from 1.5:1 to 0.9:1, preferably from 1.2:1 to 1:1. Other preferred acylated nitrogen compounds for use herein include: the compound formed by reacting a polyisobutylene succinic anhydride (PIBSA) having a PIB molecular weight of 900 to 1100, for example approximately 1000 with tetraethylene pentamine, the ratio of PIBSA to amine being from 2.5:1 to 1.5:1, preferably from 2.2:1 to 1.8:1.

c) Hydrocarbyl-Substituted Amines

Hydrocarbyl-substituted amines suitable for use in the present invention are well known to those skilled in the art and are described in a number of patents. Among these are U.S. Pat. Nos. 3,275,554; 3,438,757; 3,454,555; 3,565,804; 3,755,433 and 3,822,209. These patents describe suitable hydrocarbyl amines for use in the present invention including their method of preparation.

d) Mannich Additives

The Mannich additives comprise nitrogen-containing condensates of a phenol, aldehyde and primary or secondary amine Mannich additives can be made by reacting simultaneously or sequentially at least one of each of the following: active hydrogen compound for example a hydrocarbon-substituted phenol (e.g., an alkyl phenol wherein the alkyl group has at least an average of about 8 to 200; preferably at least 12 up to about 200 carbon atoms), having at least one hydrogen atom bonded to an aromatic carbon, with at least one aldehyde or aldehyde-producing material (typically formaldehyde or a precursor thereof) and Thus the Mannich additives being the product of a Mannich reaction between:

(a1) an aldehyde;
(b1) an amine; and
(c1) an optionally substituted phenol.

These compounds may be hereinafter referred to as "the Mannich additives". Thus in some preferred embodiments the present invention provides a gasoline composition comprising a quaternary ammonium salt(s) additive (i) and a Mannich additive.

Any aldehyde may be used as aldehyde component (a1) of the Mannich additive. Preferably the aldehyde component (a1) is an aliphatic aldehyde. Preferably the aldehyde has 1 to 10 carbon atoms, preferably 1 to 6 carbon atoms, more preferably 1 to 3 carbon atoms. Most preferably the aldehyde is formaldehyde.

Amine component (b1) may be at least one amino or polyamino compound having at least one NH group. The amino compounds include primary or secondary monoamines having hydrocarbon substituents of 1 to 30 carbon atoms or hydroxyl-substituted hydrocarbon substituents of 1 to about 30 carbon atoms.

In a preferred embodiment, the amine component (b1) is a polyamine.

Polyamines may be selected from any compound including two or more amine groups. Preferably the polyamine is a (poly)alkylene polyamine (by which is meant an alkylene polyamine or a polyalkylene polyamine; including in each case a diamine, within the meaning of "polyamine"). Preferably the polyamine is a (poly)alkylene polyamine in which the alkylene component has 1 to 6, preferably 1 to 4, most preferably 2 to 3 carbon atoms. Most preferably the polyamine is a (poly) ethylene polyamine (that is, an ethylene polyamine or a polyethylene polyamine).

Preferably the polyamine has 2 to 15 nitrogen atoms, preferably 2 to 10 nitrogen atoms, more preferably 2 to 8 nitrogen atoms.

Preferably the polyamine component (b1) includes the moiety $R^1R^2NCHR^3CHR^4NR^5R^6$ wherein each of $R^1$, $R^2$ $R^3$, $R^4$, $R^5$ and $R^6$ is independently selected from hydrogen, and an optionally substituted alkyl, alkenyl, alkynyl, aryl, alkylaryl or arylalkyl substituent.

Thus the polyamine reactants used to make the Mannich reaction products of the present invention preferably include an optionally substituted ethylene diamine residue.

Preferably at least one of $R^1$ and $R^2$ is hydrogen. Preferably both of $R^1$ and $R^2$ are hydrogen.

Preferably at least two of $R^1$, $R^2$, $R^5$ and $R^6$ are hydrogen.

Preferably at least one of $R^3$ and $R^4$ is hydrogen. In some preferred embodiments each of $R^3$ and $R^4$ is hydrogen. In some embodiments $R^3$ is hydrogen and $R^4$ is alkyl, for example $C_1$ to $C_4$ alkyl, especially methyl.

Preferably at least one of $R^5$ and $R^6$ is an optionally substituted alkyl, alkenyl, alkynyl, aryl, alkylaryl or arylalkyl substituent.

In embodiments in which at least one of $R^1$, $R^2$, $R^3$, $R^4$, $R^5$ and $R^6$ is not hydrogen, each is independently selected from an optionally substituted alkyl, alkenyl, alkynyl, aryl, alkylaryl or arylalkyl moiety. Preferably each is independently selected from hydrogen and an optionally substituted C(1-6) alkyl moiety.

In particularly preferred compounds each of $R^1$, $R^2$, $R^3$, $R^4$ and $R^5$ is hydrogen and $R^6$ is an optionally substituted alkyl, alkenyl, alkynyl, aryl, alkylaryl or arylalkyl substituent. Preferably $R^6$ is an optionally substituted C(1-6) alkyl moiety.

Such an alkyl moiety may be substituted with one or more groups selected from hydroxyl, amino (especially unsubstituted amino; —NH—, —NH$_2$), sulpho, sulphoxy, C(1-4) alkoxy, nitro, halo (especially chloro or fluoro) and mercapto.

There may be one or more heteroatoms incorporated into the alkyl chain, for example O, N or S, to provide an ether, amine or thioether.

Especially preferred substituents $R^1$, $R^2$, $R^3$, $R^4$, $R^5$ or $R^6$ are hydroxy-C(1-4)alkyl and amino-(C(1-4)alkyl, especially HO—CH$_2$—CH$_2$— and H$_2$N—CH$_2$—CH$_2$—.

Suitably the polyamine includes only amine functionality, or amine and alcohol functionalities.

The polyamine may, for example, be selected from ethylenediamine, diethylenetriamine, triethylenetetremine, tetraethylenepentamine, pentaethylene-hexamine, hexaethyleneheptamine, heptaethyleneoctamine, propane-1,2-diamine, 2(2-amino-ethylamino)ethanol, and N',N-bis(2-aminoethyl)ethylenediamine (N(CH$_2$CH$_2$NH$_2$)$_3$). Most preferably the polyamine comprises tetraethylenepentamine or ethylenediamine.

Commercially available sources of polyamines typically contain mixtures of isomers and/or oligomers, and products prepared from these commercially available mixtures fall within the scope of the present invention.

The polyamines used to form the Mannich additives of the present invention may be straight chained or branched, and may include cyclic structures.

In preferred embodiments, the Mannich additives of the present invention are of relatively low molecular weight.

Preferably molecules of the Mannich additive product have a number average molecular weight of less than 10000, preferably less than 7500, preferably less than 2000, more preferably less than 1500.

Optionally substituted phenol component (c1) may be substituted with 0 to 4 groups on the aromatic ring (in addition to the phenol OH). For example it may be a tri- or di-substituted phenol. Most preferably component (c1) is a mono-substituted phenol. Substitution may be at the ortho, and/or meta, and/or para position(s).

Each phenol moiety may be ortho, meta or para substituted with the aldehyde/amine residue. Compounds in which the aldehyde residue is ortho or para substituted are most commonly formed. Mixtures of compounds may result. In preferred embodiments the starting phenol is par substituted and thus the ortho substituted product results.

The phenol may be substituted with any common group, for example one or more of an alkyl group, an alkenyl group, an alkynl group, a nitryl group, a carboxylic acid, an ester, an ether, an alkoxy group, a halo group, a further hydroxyl group, a mercapto group, an alkyl mercapto group, an alkyl sulphoxy group, a sulphoxy group, an aryl group, an arylalkyl group, a substituted or unsubstituted amine group or a nitro group.

Preferably the phenol carries one or more optionally substituted alkyl substituents. The alkyl substituent may be optionally substituted with, for example, hydroxyl, halo, (especially chloro and fluoro), alkoxy, alkyl, mercapto, alkyl sulphoxy, aryl or amino residues. Preferably the alkyl group consists essentially of carbon and hydrogen atoms. The substituted phenol may include a alkenyl or alkynyl residue including one or more double and/or triple bonds. Most preferably the component (c1) is an alkyl substituted phenol group in which the alkyl chain is saturated. The alkyl chain may be linear or branched.

Preferably component (c1) is a monoalkyl phenol, especially a para-substituted monoalkyl phenol.

Preferably component (c1) comprises an alkyl substituted phenol in which the phenol carries one or more alkyl chains having a total of less 28 carbon atoms, preferably less than 24 carbon atoms, more preferably less than 20 carbon atoms, preferably less than 18 carbon atoms, preferably less than 16 carbon atoms and most preferably less than 14 carbon atoms.

Preferably the or each alkyl substituent of component (c1) has from 4 to 20 carbons atoms, preferably 6 to 18, more preferably 8 to 16, especially 10 to 14 carbon atoms. In a particularly preferred embodiment, component (c1) is a phenol having a C12 alkyl substituent.

Preferably the or each substituent of phenol component (c1) has a molecular weight of less than 400, preferably less than 350, preferably less than 300, more preferably less than 250 and most preferably less than 200. The or each substituent of phenol component (c) may suitably have a molecular weight of from 100 to 250, for example 150 to 200.

Molecules of component (c1) preferably have a molecular weight on average of less than 1800, preferably less than 800, preferably less than 500, more preferably less than 450, preferably less than 400, preferably less than 350, more preferably less than 325, preferably less than 300 and most preferably less than 275.

Components (a1), (b1) and (c1) may each comprise a mixture of compounds and/or a mixture of isomers.

The Mannich additive is preferably the reaction product obtained by reacting components (a1), (b1) and (c1) in a molar ratio of from 5:1:5 to 0.1:1:0.1, more preferably from 3:1:3 to 0.5:1:0.5.

To form the Mannich additive of the present invention components (a1) and (b1) are preferably reacted in a molar ratio of from 6:1 to 1:4 (aldehyde:polyamine), preferably from 4:1 to 1:2, more preferably from 3:1 to 1:1.

To form a preferred Mannich additive of the present invention the molar ratio of component (a1) to component (c1) (aldehyde:phenol) in the reaction mixture is preferably from 5:1 to 1:4, preferably from 3:1 to 1:2, for example from 1.5:1 to 1:1.1.

Some preferred compounds used in the present invention are typically formed by reacting components (a1), (b1) and (c1) in a molar ratio of 2 parts (a1) to 1 part (b1) ±0.2 parts (b1), to 2 parts (c1)±0.4 parts (c1); preferably approximately 2:1:2 (a1:b1:c1).

Some preferred compounds used in the present invention are typically formed by reacting components (a1), (b1) and (c1) in a molar ratio of 2 parts (a1) to 1 part (b1)+0.2 parts (b1), to 1.5 parts (c1)±0.3 parts (c1); preferably approximately 2:1:1.5 (a1:b1:c1).

Suitable treat rates of the quaternary ammonium salt(s) additive (i) and when present the Mannich additive will depend on the desired performance and on the type of engine in which they are used. For example different levels of additive may be needed to achieve different levels of performance.

e) Aromatic Esters of a Polyalkylphenoxyalkanol

The aromatic ester component which may be employed additive composition is an aromatic ester of a polyalkylphenoxyalkanol and has the following general formula:

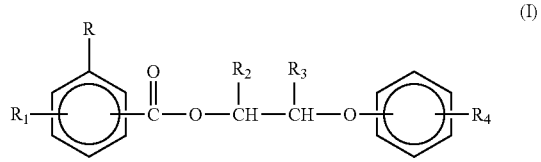

or a fuel-soluble salt(s) thereof wherein R is hydroxy, nitro or —(CH2)x-NR$_5$R$_6$, wherein R$_5$ and R$_6$ are independently hydrogen or lower alkyl having 1 to 6 carbon atoms and x is 0 or 1;

R$_1$ is hydrogen, hydroxy, nitro or —NR$_7$R$_6$ wherein R$_7$ and R$_8$ are independently hydrogen or lower alkyl having 1 to 6 carbon atoms;

R$_2$ and R$_3$ are independently hydrogen or lower alkyl having 1 to 6 carbon atoms; and R$_4$ is a polyalkyl group having an average molecular weight in the range of about 450 to 5,000.

The preferred aromatic ester compounds employed in the present invention are those wherein R is nitro, amino, N-alkylamino, or —CH$_2$NH$_2$ (aminomethyl). More preferably, R is a nitro, amino or —CH$_2$NH$_2$ group. Most preferably, R is an amino or —CH$_2$NH$_2$ group, especially amino. Preferably, R$_1$ is hydrogen, hydroxy, nitro or amino. More preferably, R$_1$ is hydrogen or hydroxy. Most preferably, R$_1$ is hydrogen. Preferably, R$_1$ is a polyalkyl group having an average molecular weight in the range of about 500 to 3,000, more preferably about 700 to 3,000, and most preferably about 900 to 2,500. Preferably, the compound has a combination of preferred substituents.

Preferably, one of R$_2$ and R$_3$ is hydrogen or lower alkyl of 1 to 4 carbon atoms, and the other is hydrogen. More preferably, one of R$_2$ and R$_3$ is hydrogen, methyl or ethyl, and the other is hydrogen. Most preferably, R$_2$ is hydrogen, methyl or ethyl, and R$_3$ is hydrogen.

When R and/or R$_1$ is an N-alkylamino group, the alkyl group of the N-alkylamino moiety preferably contains 1 to 4 carbon atoms. More preferably, the N-alkylamino is N-methylamino or N-ethylamino.

Similarly, when R and/or R$_1$ is an N,N-dialkylamino group, each alkyl group of the N,N-dialkylamino moiety preferably contains 1 to 4 carbon atoms. More preferably, each alkyl group is either methyl or ethyl. For example, particularly preferred N,N-dialkylamino groups are N,N-dimethylamino, N-ethyl-N-methylamino and N,N-diethylamino groups.

A further preferred group of compounds are those wherein R is amino, nitro, or —CH$_2$NH$_2$ and R$_1$ is hydrogen or hydroxy. A particularly preferred group of compounds are those wherein R is amino, R$_1$, R$_2$ and R$_3$ are hydrogen, and R$_4$ is a polyalkyl group derived from polyisobutene.

It is preferred that the R substituent is located at the meta or, more preferably, the para position of the benzoic acid moiety, i.e., para or meta relative to the carbonyloxy group. When R$_1$ is a substituent other than hydrogen, it is particularly preferred that this R$_1$ group be in a meta or pare position relative to the carbonyloxy group and in an ortho position relative to the R substituent. Further, in general, when R$_1$ is other than hydrogen, it is preferred that one of R or R$_1$ is located para to the carbonyloxy group and the other is located meta to the carbonyloxy group. Similarly, it is preferred that the R$_4$ substituent on the other phenyl ring is located para or meta, more preferably para, relative to the ether linking group.

The aromatic esters e) will generally have a molecular weight in the range from about 700 to about 3,500, preferably from about 700 to about 2,500.

Fuel-soluble salt(s)s of the compounds e) can be readily prepared for those compounds containing an amino or substituted amino group and such salt(s)s are contemplated to be useful for preventing or controlling engine deposits. Suitable salt(s)s include, for example, those obtained by protonating the amino moiety with a strong organic acid, such as an alkyl- or arylsulfonic acid. Preferred salt(s)s are derived from toluenesulfonic acid and methanesulfonic acid.

When the R or R$_1$ substituent is a hydroxy group, suitable salt(s)s can be obtained by deprotonation of the hydroxy group with a base. Such salt(s)s include salt(s)s of alkali metals, alkaline earth metals, ammonium and substituted ammonium salt(s)s. Preferred salt(s)s of hydroxy-substituted compounds include alkali metal, alkaline earth metal and substituted ammonium salt(s)s.

The fuels compositions of the invention may contain, in addition to the quaternary ammonium salt(s) and the gasoline, and the other components a)-e) described above when present, unreacted raw materials and other reaction products and any of the other additives conventionally added to gasoline as, for example, other detergents, dispersants, antioxidants, anti-icing agents, metal deactivators, lubricity additives, friction modifiers, dehazers, corrosion inhibitors, dyes, markers, octane improvers, anti-valve-seat recession additives, stabilisers, demulsifiers, antifoams, odour masks, conductivity improvers, combustion improvers, etc."

Suitably the quaternary ammonium salt(s) additive is present in the gasoline composition in an amount of less than 10,000 ppm, preferably less than 1,000 ppm, preferably less than 500 ppm, preferably less than 350 ppm, preferably less than 250 ppm.

Suitably the carrier oil a) when used is present in the gasoline composition in an amount of less than 10,000 ppm, 1,000 ppm preferably less than 500 ppm, preferably less than 350 ppm, preferably less than 250 ppm.

Suitably the mannich additive d) when used is present in the gasoline composition in an amount of less than 10,000 ppm, 1,000 ppm preferably less than 500 ppm, preferably less than 350 ppm, preferably less than 250 ppm.

Preferably the composition provides on a weight basis, from 10 to 500 ppm quaternary ammonium salt(s) (i) and, when present, 30 to 500 ppm carrier oil (a).

Compound(s) (i) and, where present, (ii) may be added separately or they may be added as a single package. All references to treat rates and ratios of compounds herein apply to additive compounds whether added separately or when added as a package.

Additive Composition

Preferably the compound(s) (i) and (ii) (when (ii) is present) and preferably also any further fuel additive compounds present for other purposes, are provided as an additive composition, in a common detergent package.

The quaternary ammonium salt(s) (i) may be present in an additive package in an amount to provide the necessary and/or required handling properties and/or functional properties, in use. Typically the quaternary ammonium salt(s) (i) (including unreacted raw materials, other reaction products and solvent of production) is present in an amount of from 10 to 60% by weight, preferably 30 to 60% by weight, based on the total additive composition. Typically the quaternary ammonium salt(s) (i) (excluding unreacted raw materials, other reaction products and solvent of production) is present in an amount of from 1 to 36% by weight, preferably 5 to 36% by weight more preferably 9 to 36%, based on the total additive composition.

The carrier oil a) when present may be present in an amount of from 2 to 40% by weight, based on the total additive composition.

In a preferred aspect the additive composition which may be used in the present invention further comprises a solvent. The solvent may be a hydrocarbon solvent having a boiling point in the range 66 to 320° C. Suitable solvents include xylene, toluene, white spirit, mixtures of aromatic solvents boiling in the range 180° C. to 270° C.

If present the amount of solvent to be incorporated will depend upon the desired final viscosity of the additive composition. Typically the solvent will be present in an amount of from 20 to 70% of the final additive composition on a weight basis.

In a preferred aspect an additive composition useful in the present invention comprises a solvent and a co-solvent. The co-solvent may be typically present in an amount of 1-10% preferably 1-2 wt %. Suitable co-solvents include aliphatic alcohols (such as CAS no 66455-17-2)

Additive compositions useful in the present invention may contain a number of minor ingredients, often added to meet specific customer requirements. Included amongst these are dehazers, usually an alkoxylated phenol formaldehyde resin, added to minimise water interaction and to prevent a hazy or cloudy appearance of the fuel composition, and a corrosion inhibitor, usually of the type comprising a blend of one or more fatty acids and/or amines. Either or both may be present in the additive compositions useful in the present invention in amounts ranging from 0.1 to 5%, or 1 to 3% each, based on the total weight of the additive composition.

Other minor ingredients which may be added include anti-oxidants, anti-icing agents, metal deactivators, lubricity additives, friction modifiers, dehazers, corrosion inhibitors, dyes, markers, octane improvers, anti-valve-seat recession additives, stabilisers, demulsifiers, antifoams, odour masks, conductivity improvers and combustion improvers. These may be added in amounts according to conventional practice, typically ranging from 0.001%, up to 2 or 3%, by weight, based on the total weight of the fuel composition.

In general terms the total amount of such minor functional ingredients in the additive composition will not exceed about 10% by weight, more usually not exceeding about 5% by weight based on the total weight of the additive composition.

Such further ingredients could in principle be added separately to compound(s) (i) but it is preferred for reasons of convenience and consistency of dosing to add them with compound(s) (i) and—when present, with compounds (II)—in a common additive composition.

Preferably the compound(s) (I) and (ii) (when present) is/are present in the fuel in the fuel storage tank which supplies the engine. Although they could be mixed into the fuel in the storage tank, preferably they are present in bulk fuel which is pumped into the storage tank.

In a second aspect the present invention provides an additive composition as described or defined herein, the additive composition containing:
  (i) one or more quaternary ammonium salt(s) as defined in the first aspect and
  (ii) optionally, one or more additional components selected from a)-e) described above.

Method

In a third aspect the present invention provides a method of controlling deposits in a direct injection spark ignition gasoline engine, the method comprising adding into the gasoline to be combusted:
  (i) one or more quaternary ammonium salt(s) as defined in the first aspect and
  (ii) optionally, one or more additional components selected from a)-e) described above.

In a fourth aspect the present invention provides a method of improving the efficiency of a direct injection spark ignition gasoline engine, the method comprising adding into the gasoline to be combusted:
  (i) one or more quaternary ammonium salt(s) as defined in the first aspect and
  (ii) optionally, one or more additional components selected from a)-e) described above.

In a fifth aspect the present invention provides a method of operating a direct injection spark ignition gasoline engine, the method comprising adding into the gasoline to be combusted:
  (i) one or more quaternary ammonium salt(s) as defined in the first aspect and
  (ii) optionally, one or more additional components selected from a)-e) described above
  wherein the method provides one or more of: —
  improved fuel economy
  reduced maintenance
  less frequent overhaul or replacement of injectors
  improved driveability
  improved power
  improved acceleration Use In a sixth aspect the present invention provides the use of (i) one or more quaternary ammonium salt(s) as defined in the first aspect and, optionally of (ii) one or more additional components selected from a)-e) described above; added into gasoline to control deposits in a direct injection spark ignition gasoline engine.

In a seventh aspect the present invention provides the use of (i) one or more quaternary ammonium salt(s) as defined in the first aspect and, optionally of (ii) one or more additional components selected from a)-e) described above; added into gasoline to improve efficiency in a direct injection spark ignition gasoline engine.

In an eighth aspect the present invention provides the use of a gasoline comprising (i) one or more quaternary ammonium salt(s) as defined in the first aspect and, optionally of (ii) one or more additional components selected from a)-e) described above; in a direct injection spark ignition gasoline engine to provide one or more of: — improved fuel economy
reduced maintenance
less frequent overhaul or replacement of injectors
improved driveability
improved power
improved acceleration In any definitions given in this specification for concentrations or ratios of components the total amount of given components is taken; for example the total amount of quaternary ammonium salts (i), or the total amount of carrier oils (a).

The present invention will now be described by way of Example only,

EXAMPLES

Example 1

Additive A, the reaction product of a hydrocarbyl substituted acylating agent and a compound of formula (B1) was prepared as follows:

523.88 g (0.425 moles) PIBSA (made from 1000 MW PIB and maleic anhydride) and 373.02 g Caromax 20 were charged to 1 litre vessel. The mixture was stirred and heated, under nitrogen to 50° C. 43.69 g (0.425 moles), DMAPA was added and the mixture heated to 160° C. for 5 hours, with concurrent removal of water using a Dean-Stark apparatus. Additive A was believed to be approximately 60% active material and 40% solvent.

[Note: PIB herein means polyisobutene; PIBSA means polyisobutenyl-substituted succinic anhydride; DMAPA means dimethylaminopropylamine]

Example 2

Additive B, an additive comprising a quaternary ammonium salt(s) additive of the present invention was prepared as follows:

588.24 g (0.266 moles) of Additive A mixed with 40.66 g (0.266 moles) methyl salicylate under nitrogen. The mixture was stirred and heated to 160° C. for 16 hours.

The product mixture of this reaction was used without further processing as additive B and contained the quaternary ammonium salt(s) additive of the present invention, together with any unreacted raw materials, other reaction products and solvent. The solvent content of Additive B was approximately 35%.

Example 3

Gasoline compositions were prepared comprising the additives listed in Table 2, added to aliquots all drawn from a common batch of DF12 reference fuel.

Additive C is a carrier oil compound a), namely a linear C13 linear alcohol polyether with 13 PO units.

Table 1 below shows the specification for the DF12 reference fuel.

TABLE 1

| Parameter | Units | Result | Min. | Max. | Method |
|---|---|---|---|---|---|
| RON | — | 99.2 | 95.0 | — | EN 25164 |
| MON | — | 88.9 | 85.0 | — | EN 25163 |
| Density 15° C. | kg/m$^3$ | 739.9 | 720.0 | 775.0 | EN ISO 12185 |
| Vapour pressure, DVPE | kPa | 59.4 | 60.0 | 90.0 | EN 13016-1 |
| Distillation I.B.P. | ° C. | 32.4 | — | — | EN ISO 3405 |
| Dist. 70° C. | % v/v | 27.1 | 22.0 | 50.0 | EN ISO 3405 |
| Dist. 100° C. | % v/v | 44.9 | 46.0 | 71.0 | EN ISO 3405 |
| Dist. 150° C. | % v/v | 85.0 | 75.0 | — | EN ISO 3405 |
| Distillation F.B.P. | ° C. | 197.8 | — | 210.0 | EN ISO 3405 |
| Dist. Residue | % v/v | 1.0 | — | 2.0 | EN ISO 3405 |
| Benzene | % v/v | 0.3 | — | 5.0 | EN 236 |
| Oxygenates | — | — | — | — | ASTM D 4815 |
| Methanol | % v/v | <0.1 | — | 3.0 | |
| Ethanol | % v/v | <0.1 | — | 5.0 | |
| TBA | % v/v | <0.1 | — | 7.0 | |
| i-Propanol | % v/v | <0.1 | — | 10.0 | |
| i-Butanol | % v/v | <0.1 | — | 7.0 | |
| MTBE | % v/v | <0.1 | — | 15.0 | |
| Oxygenates total | % v/v | <0.1 | — | | |
| Oxygen content | % m/m | <0.1 | — | 2.7 | |
| FIA | — | — | — | — | ASTM D 1319 |
| Aromatics | % v/v | 31.2 | — | 42.0 | |
| Olefins | % v/v | 6.2 | — | 18.0 | |
| Saturates | % v/v | 62.2 | — | — | |
| Sulphur content | mg/kg | 19 | — | | EN 24260 |
| Lead content | mg/l | <5 | — | 5 | EN 237 |
| Oxidation stability | min. | >1200 | 360 | — | EN ISO 7536 |
| Unwashed gum | mg/100 ml | 2.0 | — | — | EN ISO 6246 |
| Solvent washed gum | mg/100 ml | 0.2 | — | 5 | EN ISO 6246 |
| Hydrogen content | % m/m | 13.38 | — | — | ASTM D 3343 |
| Carbon content | % m/m | 86.62 | — | — | ASTM D 3343 |
| Carbon/Hydrogen ratio | | 6.47:1 | — | — | ASTM D 3343 |
| Hydrogen/Carbon ratio | | 0.155:1 | — | — | ASTM D 3343 |
| Net heat value | MJ/kg | 42.923 | — | — | ASTM D 3338 |
| Net heat value | Btu/lb | 18450 | — | — | ASTM D 3338 |

Example 4

Fuel compositions 1 to 3 listed in table 1 were tested according to the CEC F-05-93 Intake Valve Deposit Test Method.

This test method is designed to evaluate the propensity of gasoline or gasoline additive formulations to prevent intake valve deposits in fuel injected engines.

The engine is an in-line, four cylinder, four stroke 2.3 litre overhead camshaft mechanical/electronic fuel injection engine. After running-in (new engine only) and checking, the engine is operated for a period of 60 hours under cyclic conditions, simulating stop-go operation, with the inlet valves pegged to prevent rotation. The ability of a gasoline or gasoline formulation to influence deposit formation on the inlet valves is determined The results are expressed by the weight of the deposits accumulated during the test on the intake valves and in terms of deposit merit ratings based on a scale from 4.5 (extremely heavy inlet valve deposits) to
10 (clean inlet valve).

The results are presented as the average, over 4 valves.

Full details of the CEC F-05-93 test method can be obtained from the CEC (The Coordinating European Council for the Development of Performance Tests for Fuels, Lubricants and Other Fluids, having its registered office in Brussels, Belgium).

Results are shown in Table 2 below

TABLE 2

| Composition | Additive B (mg/litre) | Additive C (mg/litre) | Valve Weight (mg/valve) | Valve Rating |
|---|---|---|---|---|
| Basefuel | — | — | 358.4 | |
| 1 | 500 | | 0.8 | 9.96 |
| 2 | 250 | 150 | 65.2 | 9.51 |
| 3 | 167 | | 291 | 8.73 |
| 4 | 250 | | 185.4 | 9.90 |

The amounts stated above refer to the reaction products of Examples 2 and 3 as such including solvents (when present).

Example 5

A second sample of quaternary ammonium salt additive of the present invention was prepared, Additive D.

Additive D was prepared in a similar way to the additives described above, using the following raw materials: 1000 MW PIB, (45.4 parts weight), maleic anhydride (4.2 parts weight), DMAPA (4.2 parts weight), solvent (39.9 parts weight), methyl salicylate (6.3 parts weight). The finished product contained approximately 40% solvent.

Example 6

Additive E was a hydrocarbyl substituted amine comprising approximately 45% by weight of a polyisobutenamine having a molecular weight of 1000 and approximately 55% by weight solvent. Additive E was a commercially available product sold under the trade name of Kerocom PIBA.

Example 7

Additive F was prepared as follows.

1000 mwt high reactive PIB derived PIBSA (4712 g) was stirred with aromatic solvent (Caromax 20, 3337 g) in a 10 litre oil jacketed reactor equipped with an overhead stirrer, thermometer and Dean & Stark trap. A polyethylene polyamine mixture of average composition approximating to tetraethylene pentamine (363.2 g. 1.92 mol) was added in one aliquot with continued stirring at 50° C. An immediate exotherm was noted. The reaction mix was heated to 160° C. for three hours whilst removing water via a Dean & Stark trap. 8343 g of a clear brown liquid product was obtained. Additive F was found to contain 60% non-volatiles and 40% solvent.

Example 8a

Additive G was prepared as follows:

Phenol alkylated with 1000 MW PIB (356.3 g, 0.326 moles) and Caromax 20 (185.7 g) were charged to a reactor and mixed with constant stirring at ambient temperature below 30 degC under a nitrogen purge. Ethylenediamine (19.6 g, 0.326 moles) was then charged to the reactor. The mixture was heated to a temperature of 95 degC. Formalin (26.7 g, 0.326 moles, 36.6 wt % formaldehyde in water and methanol) was charged to the reactor over 1 hr at 95-100 degC. A mild exotherm was noted. Following the addition the mixture was held at 95 degC for 1 hr. The reaction mixture was heated to reflux. The azeotropic blend of water and solvent was removed continuously over a period lasting 2 hours. The temperature was increased as required to sustain removal of water, then the reaction mixture heated gradually to 150 degC. The product dissolved in Caromax 20 was obtained as a clear amber solution (561.9 g). Additive G was found to contain 65% non-volatiles and 35% solvent.

Example 8b

Additive J is a carrier oil compound, namely a hydrocarbyl-substituted polyoxyalkylene amine comprising approximately 53% non-volatiles and 47% solvent. This polyetheramine was a commercial product obtained under the trade name Ultrazol and comprised a polypropylene glycol backbone capped with a C12-C15 ether substituent and a 3-aminopropyl substituent.

Example 9

Gasoline compositions were prepared comprising the additives listed in Table 4, added to aliquots all drawn from a common batch of DF12 reference fuel.

Additive H is a carrier oil compound a), namely a linear $C_{10}$ alcohol polyether with 24 PO units. Additive H did not contain any solvents.

Table 3 below shows the specification for the DF12 reference fuel.

TABLE 3

| Parameter | Units | Result | Min. | Max. | Method |
|---|---|---|---|---|---|
| RON | — | 96.6 | 95.0 | — | EN ISO 5164 |
| MON | — | 86.9 | 85.0 | — | EN ISO 5163 |
| Density at 15° C. | kg/m³ | 733.6 | 720.0 | 775.0 | EN ISO 12185 |
| DVPE | kPa | 86.3 | 60.0 | 90.0 | EN 13016-1 |
| Distillation IBP | ° C. | 28.4 | — | — | EN ISO 3405 |
| Dist. 70° C. | % vol | 33.2 | 22.0 | 50.0 | EN ISO 3405 |
| Dist. 100° C. | % vol | 52.6 | 46.0 | 71.0 | EN ISO 3405 |
| Dist. 150° C. | % vol | 93.5 | 75.0 | — | EN ISO 3405 |
| Distillation FBP | % vol | 182.4 | — | 210.0 | EN ISO 3405 |
| Dist. Residue | % vol | 1.0 | — | 2.0 | EN ISO 3405 |
| Olefins | % vol | 7.5 | — | 18.0 | EN ISO 22854 |
| Aromatics | % vol | 32.1 | — | 42.0 | EN ISO 22854 |
| Saturates | % vol | 59.5 | — | — | EN ISO 22854 |
| Benzene | % vol | 0.75 | — | 5.00 | EN ISO 22854 |
| Methanol | % vol | <0.1 | — | 3.00 | EN ISO 22854 |
| Ethanol | % vol | 0.90 | — | 1.00 | EN ISO 22854 |
| Iso-Propanol | % vol | <0.1 | — | 10.00 | EN ISO 22854 |
| Iso-Butanol | % vol | <0.1 | — | 7.00 | EN ISO 22854 |
| TBA | % vol | <0.1 | — | 7.00 | EN ISO 22854 |
| MTBE | % vol | <0.1 | — | 15.00 | EN ISO 22854 |
| Oxygenates | % vol | 0.9 | — | — | EN ISO 22854 |
| Oxygen content | % wt | 0.3 | — | 2.7 | EN ISO 22854 |
| Sulphur | mg/kg | 5.8 | — | — | EN ISO 20846 |
| Lead | mg/l | <2.5 | — | 5.0 | EN 237 |
| Oxidation stability | min | >1200 | 360 | — | EN ISO 7536 |
| Unwashed Gum | mg/100 ml | 5 | — | — | EN ISO 6246 |
| Solvent washed gum | mg/100 ml | 3 | — | 5 | EN ISO 6246 |
| Hydrogen | % wt | 13.3 | — | — | ASTM D 3343 |
| Carbon | % wt | 86.35 | — | — | ASTM D 3343 |

TABLE 3-continued

| Parameter | Units | Result | Min. | Max. | Method |
|---|---|---|---|---|---|
| Carbon/Hydrogen ratio | — | 6.49 | — | — | ASTM D 3343 |
| Hydrogen/Carbon ratio | — | 0.154 | — | — | ASTM D 3343 |
| Net heating value | MJ/kg | 42.678 | — | — | ASTM D 3338 |
| Net heating value | Btu/lb | 18347 | — | — | ASTM D 3338 |

Example 10

The fuel compositions listed in Table 4 were tested according to the CEC F-05-93 Intake Valve Deposit Test Method referred to in Example 4.

TABLE 4

| Composit'n | Additive D (mg/litre) | Additive E (mg/litre) | Additive F (mg/litre) | Additive C (mg/litre) | Additive H (mg/litre) | Additive J (mg/litre) | Valve Weight (mg/valve) | Valve Rating |
|---|---|---|---|---|---|---|---|---|
| DF12 fuel | — | — | — | — | — | — | 714.8 | 7.0 |
| 5 | 150 | — | — | — | 150 | — | 95.9 | 9.2 |
| 6 | 75 | 75 | — | — | 150 | — | 30.4 | 9.5 |
| 7 | 75 | — | 75 | — | 150 | — | 170.6 | 8.9 |
| 8a | 75 | — | — | 75 | 150 | — | 22.1 | 9.8 |
| 8b | 75 | — | — | — | — | 225 | 0.4 | 9.95 |

In each case, the additive concentration is measured in mg/litre of the non volatile material.

Example 11

Additive I, a quaternary ammonium salt additive of the present invention was prepared as follows:

33.9 kg (27.3 moles) of a polyisobutyl-substituted succinic anhydride having a PIB molecular weight of 1000 was heated to 90° C. 2.79 kg (27.3 moles) dimethylaminopropylamine was added and the mixture stirred at 90 to 100° C. for 1 hour. The temperature was increased to 140° C. for 3 hours with concurrent removal of water. 25 kg of 2-ethyl hexanol was added, followed by 4.15 kg methyl salicylate (27.3 moles) and the mixture maintained at 140° C. for 9.5 hours.

Additive I was found to contain approximately 61% non-volatile material and 39% solvent.

Example 12

Additive K, a quaternary ammonium salt additive which may be used in the present invention was prepared as follows.

45.68 g (0.0375 moles) of Additive A was mixed with 15 g (0.127 moles) dimethyl oxalate and 0.95 g octanoic acid. The mixture was heated to 120° C. for 4 hours. Excess dimethyl oxalate was removed under vacuum. 35.10 g of product was diluted with 23.51 g Caromax 20.

Example 13

Additive L, a quaternary ammonium salt additive which may be used in the present invention was prepared as follows:

315.9 g (0.247 moles) of a polyisobutyl-substituted succinic anhydride having a PIB molecular weight of 1000 was mixed with 66.45 g (0.499 moles) 2-(2-dimethylaminoethoxy) ethanol and 104.38 g Caromax 20. The mixture was heated to 200° C. with removal of water. The solvent was removed under vacuum. 288.27 g (0.191 mol) of this product was reacted with 58.03 g (0.381 mol) methyl salicylate at 150° C. overnight and then 230.9 g Caromax 20 was added.

Example 14

Additive M, a quaternary ammonium salt additive which may be used in the present invention was prepared as follows:

33.9 kg (27.3 moles) of a polyisobutyl-substituted succinic anhydride having a PIB molecular weight of 1000 was heated to 90° C. 2.79 kg (27.3 moles) dimethylaminopropylamine was added and the mixture stirred at 90 to 100° C. for 1 hour. The temperature was increased to 140° C. for 3 hours with concurrent removal of water. 25 kg of 2-ethyl hexanol was added, followed by 4.15 kg methyl salicylate (27.3 moles) and the mixture maintained at 140° C. for 9.5 hours.

Example 15

Additive N, a quaternary ammonium salt additive which may be used in the present invention was prepared as follows:

A polyisobutyl-substituted succinic anhydride having a PIB molecular weight of 260 was reacted with dimethylaminopropylamine using a method analogous to that described in example 10. 213.33 g (0.525 moles) of this material was added to 79.82 (0.525 moles) methyl salicylate and the mixture heated to 140° C. for 24 hours before the addition of 177 g 2-ethylhexanol.

Example 16

Additive O, a quaternary ammonium salt additive which may be used in the present invention was prepared as follows:

A reactor was charged with 201.13 g (0.169 mol) of Additive A, 69.73 g (0.59 mol) dimethyl oxalate end 4.0 g 2-ethyl hexanoic acid. The mixture was heated to 120° C. for 4 hours. Excess dimethyl oxalate was removed under vacuum and 136.4 g Caromax 20 was added.

Example 17

Additive P, a quaternary ammonium salt additive which may be used in the present invention was prepared as follows:

251.48 g (0.192 mol) of a polyisobutyl-substituted succinic anhydride having a PIB molecular weight of 1000 and 151.96 g toluene were heated to 80° C. 35.22 g (0.393 mol) N,N-dimethyl-2-ethanolamine was added and the mixture heated to 140° C. 4 g of Amberlyst catalyst was added and mixture reacted overnight before filtration and removal of solvent. 230.07 g (0.159 mol) of this material was reacted with 47.89 g (0.317 mol) methyl salicylate at 142° C. overnight before the addition of 186.02 g Caromax 20.

Example 18

Additive Q, a quaternary ammonium salt additive of the present invention was prepared as follows:

A polyisobutyl-substituted succinic anhydride having a PIB molecular weight of 1300 was reacted with dimethylaminopropylamine using a method analogous to that described in Example 14. 20.88 g (0.0142 mol) of this material was mixed with 2.2 g (0.0144 mol) methyl salicylate and 15.4 g 2-ethylhexanol. The mixture was heated to 140° C. for 24 hours.

Example 19

Additive R, a quaternary ammonium salt additive which may be used in the present invention was prepared as follows:

A polyisobutyl-substituted succinic anhydride having a PIB molecular weight of 2300 was reacted with dimethylaminopropylamine using a method analogous to that described in Example 14. 23.27 g (0.0094 mol) of this material was mixed with 1.43 g (0.0094 mol) methyl salicylate and 16.5 g 2-ethylhexanol. The mixture was heated to 140° C. for 24 hours.

Example 20

Additive S, a quaternary ammonium salt additive which may be used in the present invention was prepared as follows:

A polyisobutyl-substituted succinic anhydride having a PIB molecular weight of 750 was reacted with dimethylaminopropylamine using a method analogous to that described in Example 14. 31.1 g (0.034 mol) of this material was mixed with 5.2 g (0.034 mol) methyl salicylate and 24.2 g 2-ethylhexanol. The mixture was heated to 140° C. for 24 hours.

Example 21

Additive T, a quaternary ammonium salt additive which may be used in the present invention was prepared as follows:

61.71 g (0.0484 mol) of a polyisobutyl-substituted succinic anhydride having a PIB molecular weight of 1000 was heated to 74° C. 9.032 g (0.0485 mol) dibutylaminopropylamine was added and the mixture heated to 135° C. for 3 hours with removal of water. 7.24 g (0.0476 mol) methyl salicylate was added and the mixture reacted overnight before the addition of 51.33 g Caromax 20.

Example 22

Additive U, a quaternary ammonium salt additive which may be used in the present invention was prepared as follows:

157.0 g (0.122 mol) of a polyisobutyl-substituted succinic anhydride having a PIB molecular weight of 1000 and 2-ethylhexanol (123.3 g) were heated to 140° C. Benzyl salicylate (28.0 g, 0.123 mol) added and mixture stirred at 140° C. for 24 hours.

Example 23

Additive V, a quaternary ammonium salt additive which may be used in the present invention was prepared as follows:

18.0 g (0.0138 mol) of Additive A and 2-ethylhexanol (12.0 g) were heated to 140° C. Methyl 2-nitrobenzoate (2.51 g, 0.0139 mol) was added and the mixture stirred at 140° C. for 12 hours.

Example 24

Basefuel

An E5 98 RON basefuel was prepared by blending 95% by volume of a reference gasoline RF-83-A-91/B16 with 5% by volume of dehydrated ethanol denatured with cyclohexane. Analytical data for the reference gasoline is given in Table 5.

TABLE 5

| Analysis of RF-83-A-91/B16 | |
|---|---|
| Property | Result |
| Density at 15° C. | 750 kg/m$^3$ |
| Reid Vapour Pressure | 598 mbar |
| Distillation | |
| IBP | 35° C. |
| 10% Vol | 50° C. |
| 50% Vol | 105° C. |
| 90% Vol | 161° C. |
| FBP | 207° C. |
| Composition | |
| Saturates | 49.8% Vol |
| Olefins | 12.5% Vol |
| Aromatics | 37.7% Vol |
| Sulphur | 7 mg/kg |
| Lead | <0.001 g/l |
| RON | 97.1 |
| MON | 86.2 |

RON = Research Octane Number
MON = Motor Octane Number

Test Fuel

A test fuel was prepared by blending 320 mg/l of Additive I into the basefuel. 320 mg/l of additive I is equivalent to approximately 195 mg/l on a non volatiles basis.

GDI Engine Tests

An engine test was performed using the APL GDI Nozzle Coking test.

This test was designed to check the ability of fuels and/or additives to keep injector nozzles of GDI-engines dean. The engine used is the VW FSI 036.K/ARR/VW-1.4 litre VW Lupo 2002. Engine details are as follows:

Number of Cylinders: 4
Displacement 1398 cm3
Nom. Power. 77 kW
Nom. Torque: 130 Nm
Fuel: RON 98
Spark Plugs: VAG 101 000 068 AA
Coolant: 50% Water/50% G 12 litres VW TL 774/D
The injectors have one sprayhole with 0.55 mm diameter.

The test uses a 4 stage alternating program, including part load with stratified combustion and full load at maximum torque speed. Each cycle of 4 stages has a 30 min running time. The test duration is around 50 hours (=100 cycles). The total fuel consumption is around 750 litres per test. The selected engine oil is LM Top Tec 4200 5W-30, a first fill oil for this engine type.

After the test, the engine inlet manifold is disassembled, so the nozzles can be removed for evaluation.

The deposits are rated visually, following a scale from 0 to 7.

0: Clean or a very limited number of single spots visible

7: Surface completely covered with deposits with thickness and structured surface The rating shows the best existing surface/deposit formation called "Minimum", the worst case of deposit formation called "Maximum" and an Average value, that reflects the overall appearance and distribution of little and heavy deposits.

The evaluation is made by a Scanning Electron Microscope (SEM) that shows the topography and distribution of the deposits around and in the sprayhole. An analysis of the injector deposits by Energy Dispersive X-Ray (EDX) Elemental Analysis is also performed. In particular, the iron content is considered to be the most important parameter with new and clean nozzles showing values around 50% iron and injectors with heavy deposits showing values around 5% iron.

Results are shown in Tables 6 and 7.

TABLE 6

Visual Rating of Injection Nozzle Orifice Deposits

|  | Min | Average | Max |
|---|---|---|---|
| Clean Nozzle | 0 | 0 | 1 |
| Base Fuel Reference | 6 | 7 | 7 |
| Nozzle 1 | 0 | 0 | 0 |
| Nozzle 2 | 0 | 0 | 0 |
| Nozzle 3 | 0 | 0 | 1 |
| Nozzle 4 | 0 | 0 | 0 |
| Average | 0 | 0 | 0 |

TABLE 7

EDX Elemental Analysis - % Weight iron

|  | % Weight Iron |
|---|---|
| Clean Nozzle | 50% |
| Base Fuel Reference | 5% |
| Nozzle 1 | 52.41% |
| Nozzle 2 | 54.59% |
| Nozzle 3 | 46.12% |
| Nozzle 4 | 55.22% |
| Average | 52.08% |

Example 25

A second GDI test was run as a clean up test.

In this example, a different batch of E5 98 RON basefuel was prepared by blending 95% by volume of a reference gasoline RF-83-A-91/B17 with 5% by volume of dehydrated ethanol denatured with cyclohexane. Analytical data for the reference gasoline is given in Table 8.

TABLE 8

Analysis of RF-83-A-91/B17

| Property | Result |
|---|---|
| Density at 15° C. | 752.5 kg/m$^3$ |
| Reid Vapour Pressure | 601 mbar |
| Distillation | |
| IBP | 37° C. |
| 10% Vol | 47° C. |
| 50% Vol | 106° C. |
| 90% Vol | 156° C. |
| FBP | 190° C. |
| Composition | |
| Saturates | 49.2% Vol |
| Olefins | 11.9% Vol |
| Aromatics | 38.9% Vol |
| Sulphur | 3 mg/kg |
| Lead | <0.005 g/l |
| RON | 97.7 |
| MON | 85.4 |

RON = Research Octane Number
MON = Motor Octane Number

Test Fuel

A test fuel was prepared by blending 500 mg/l of Additive I into the basefuel. 500 mg/l of Additive I is equivalent to approximately 305 mg/l on a non volatiles basis.

An engine test of the type described above was performed using the APL GDI Nozzle Coking test of Example 24 but instead of using clean injectors at the start of test, a dirty set of injectors were used.

The injectors used at the start of the test had an average visual rating of 5.

Results are shown in Tables 9 and 10.

TABLE 9

Visual Rating of Injection Nozzle Orifice Deposits

|  | Min | Average | Max |
|---|---|---|---|
| Clean Nozzle | 0 | 0 | 1 |
| Base Fuel Reference | 6 | 7 | 7 |
| Injectors at start of test |  | 5 |  |
| Nozzle 1 | 0 | 0 | 1 |
| Nozzle 2 | 0 | 0 | 1 |
| Nozzle 3 | 0 | 0 | 0 |
| Nozzle 4 | 0 | 0 | 0 |
| Average |  | 0 |  |

TABLE 10

EDX Elemental Analysis - % Weight Iron

|  | % Weight Iron |
|---|---|
| Clean Nozzle | 50% |
| Base Fuel Reference | 5% |
| Nozzle 1 | 52.56% |
| Nozzle 2 | 47.91% |
| Nozzle 3 | 50.38% |
| Nozzle 4 | 51.89% |
| Average | 50.69% |

The invention claimed is:

1. A gasoline composition comprising, as an additive, one or more quaternary ammonium salt(s) formed by the reaction of a compound of formula (A):

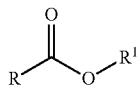

and a compound formed by the reaction of a hydrocarbyl-substituted acylating agent and an amine of formula (B1) or (B2):

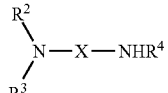

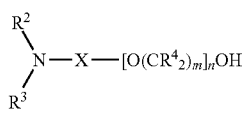

wherein R is an optionally substituted alkyl, alkenyl, aryl or alkylaryl group; $R^1$ is an alkyl, aryl or alkylaryl group having up to 36 carbon atoms; $R^2$ and $R^3$ are the same or different alkyl groups having from 1 to 36 carbon atoms; X is an alkylene group having from 1 to 20 carbon atoms; n is from 0 to 20; m is from 1 to 5; and $R^4$ is hydrogen or a $C_1$ to $C_{36}$ alkyl group;

wherein the compound of formula (A) is an ester of a carboxylic acid selected from the group consisting of a substituted aromatic carboxylic acid, an α-hydroxycarboxylic acid and a polycarboxylic acid.

2. The gasoline composition according to claim 1 wherein the compound of formula (A) is an ester of a carboxylic acid having a $pK_a$ of 3.5 or less.

3. The gasoline composition according to claim 1 wherein the compound of formula (A) is an ester of a substituted aromatic carboxylic acid.

4. The gasoline composition according to claim 3 wherein R is a substituted phenyl or naphthyl group substituted with one or more groups selected from the group consisting of optionally substituted alkyl, alkenyl, aryl or carboalkoxy groups, nitro, cyano, hydroxy, $SR^5$, $NR^5R^6$ or $COOR^7$, wherein each of $R^5$, $R^6$ and $R^7$ is a hydrogen atom or an optionally substituted alkyl, alkenyl, aryl or carboalkoxy groups.

5. The gasoline composition according to claim 1 wherein the quaternary ammonium salt(s) are formed by the reaction of a compound of formula (A) and a compound formed by the reaction of a hydrocarbyl-substituted acylating agent and an amine of formula (B1).

6. The gasoline composition according to claim 1 wherein the hydrocarbyl-substituted acylating agent is polyisobutenyl substituted succinic anhydride.

7. The gasoline composition according to claim 1 further comprising one or more additives selected from the group consisting of:
a) carrier oils;
b) acylated nitrogen compounds which are the reaction product of a carboxylic acid-derived acylating agent and an amine;
c) hydrocarbyl-substituted amines wherein the hydrocarbyl substituent is substantially aliphatic and contains at least 8 carbon atoms;
d) Mannich base additives comprising nitrogen-containing condensates of a phenol, aldehyde and primary or secondary amine; and
e) aromatic esters of a polyalkylphenoxyalkanol.

8. The gasoline composition according to claim 7 wherein component (a) is selected from the group consisting of polyethers and polyetheramines.

9. The gasoline composition according to claim 7 wherein component (d) comprises the reaction product of formaldehyde, an ethylene or polyethylene polyamine, and para-substituted monoalkyl phenol.

10. An additive package which upon addition to gasoline provides a composition as claimed in claim 1.

11. A method of improving the performance of a direct injection spark ignition gasoline engine comprising adding to gasoline one or more quaternary ammonium salt(s) formed by the reaction of a compound of formula (A):

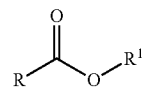

and a compound formed by the reaction of a hydrocarbyl-substituted acylating agent and an amine of formula (B1) or (B2):

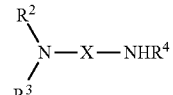

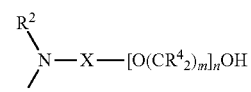

wherein R is an optionally substituted alkyl, alkenyl, aryl or alkylaryl group; $R^1$ is an alkyl, aryl or alkylaryl group having up to 36 carbon atoms; $R^2$ and $R^3$ are the same or different alkyl groups having from 1 to 36 carbon atoms; X is an alkylene group having from 1 to 20 carbon atoms; n is from 0 to 20; m is from 1 to 5; and $R^4$ is hydrogen or a $C_1$ to $C_{36}$ alkyl group; wherein the compound of formula (A) is an ester of a carboxylic acid selected from the group consisting of a substituted aromatic carboxylic acid, an α-hydroxycarboxylic acid and a polycarboxylic acid; and combusting the additised gasoline.

12. A method of controlling deposits in a direct injection spark ignition gasoline engine comprising adding to gasoline one or more quaternary ammonium salt(s) formed by the reaction of a compound of formula (A):

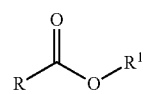

and a compound formed by the reaction of a hydrocarbyl-substituted acylating agent and an amine of formula (B1) or (B2):

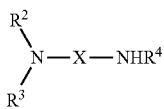 (B1)

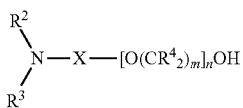 (B2)

wherein R is an optionally substituted alkyl, alkenyl, aryl or alkylaryl group; $R^1$ is an alkyl, aryl or alkylaryl group having up to 36 carbon atoms; $R^2$ and $R^3$ are the same or different alkyl groups having from 1 to 36 carbon atoms; X is an alkylene group having from 1 to 20 carbon atoms; n is from 0 to 20; m is from 1 to 5; and $R^4$ is hydrogen or a $C_1$ to $C_{36}$ alkyl group; wherein the compound of formula (A) is an ester of a carboxylic acid selected from the group consisting of a substituted aromatic carboxylic acid, an α-hydroxycarboxylic acid and a polycarboxylic acid; and combusting the additised gasoline.

13. The method according to claim 12, wherein said controlling deposits comprises reducing existing deposits or reducing deposit formation.

14. A method of controlling deposits and/or of improving the efficiency in a direct injection spark ignition gasoline engine, the method comprising adding into the gasoline to be combusted:
  (i) one or more quaternary ammonium salt(s) as defined in claim 1, and
  (ii) optionally, one or more additional components selected from a)-e) as defined in claim 7.

* * * * *